United States Patent
Brandt et al.

(10) Patent No.: US 10,607,654 B2
(45) Date of Patent: Mar. 31, 2020

(54) USING SHARDING TO GENERATE VIRTUAL REALITY CONTENT

(71) Applicant: VERIZON PATENT AND LICENSING INC., Basking Ridge, NJ (US)

(72) Inventors: Olaf Brandt, Palo Alto, CA (US); Anatoli Adamov, Palo Alto, CA (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 0 days.

(21) Appl. No.: 15/893,541

(22) Filed: Feb. 9, 2018

(65) Prior Publication Data

US 2018/0226105 A1  Aug. 9, 2018

Related U.S. Application Data

(60) Provisional application No. 62/456,864, filed on Feb. 9, 2017.

(51) Int. Cl.
| | | |
|---|---|---|
| *G11B 27/34* | (2006.01) | |
| *H04N 5/77* | (2006.01) | |
| *G11B 27/031* | (2006.01) | |
| *H04N 9/82* | (2006.01) | |
| *H04N 5/91* | (2006.01) | |

(52) U.S. Cl.
CPC ............ *G11B 27/34* (2013.01); *G11B 27/031* (2013.01); *H04N 5/77* (2013.01); *H04N 5/91* (2013.01); *H04N 9/8205* (2013.01)

(58) Field of Classification Search
CPC .... H04N 5/2258; H04N 5/23238; H04N 5/77; H04N 21/61; H04N 21/631; H04N 21/64784; G11B 27/11; G11B 27/34; G11B 31/006
USPC .................................................. 386/223, 201
See application file for complete search history.

(56) References Cited

U.S. PATENT DOCUMENTS

| | | | |
|---|---|---|---|
| 2015/0055929 A1* | 2/2015 | Van Hoff | G11B 27/11 386/201 |
| 2018/0046784 A1* | 2/2018 | Flores | G06F 21/105 |
| 2018/0091866 A1* | 3/2018 | Sun | H04N 21/631 |

* cited by examiner

*Primary Examiner* — Thai Q Tran
*Assistant Examiner* — Syed Y Hasan

(57) ABSTRACT

The disclosure describes using sharding generate virtual reality content. A method includes receiving raw virtual reality video data recorded by a camera array, wherein the camera array includes three or more camera modules. The method further includes defining shards of the raw virtual reality video data in a state file. The method further includes assigning each of the shards to a corresponding worker node in a set of worker nodes. The method further includes updating the state file to include metadata that describes a location of each of the shards at the corresponding worker node in the set of worker nodes. The method further includes providing the metadata to the set of worker nodes. The method further includes processing the shards to generate one or more virtual reality video renders for each shard, where each virtual reality video render combines the raw video feeds into a single video file.

20 Claims, 14 Drawing Sheets

400

| Shard | File | Start Time | End Time | Head Start Frames | Worker Node | Status |
|---|---|---|---|---|---|---|
| 1 | Raw Video Feed 1<br>Raw Video Feed 2 | 0:00.0<br>0:00.0 | 0:30.00<br>0:30.00 | 0<br>0 | 7 | Complete |
| 2 | Raw Video Feed 1<br>Raw Video Feed 2 | 0:29.90<br>0:29.90 | 1:00.00<br>1:00.00 | 6<br>6 | 8 | In Progress |
| 3 | Raw Video Feed 1<br>Raw Video Feed 2 | 0:59.90<br>0:59.90 | 1:21.40<br>1:21.40 | 6<br>6 | 27 | Failed |

450

| Shard | Status | Location |
|---|---|---|
| 1 | Complete | Networkdrive#1\s00001.mp4 |
| 2 | Complete | Networkdrive#2\s00002.mp4 |
| 3 | In Progress | |
| 4 | Complete | Networkdrive#7\s00004.mp4 |
| 5 | Failed | |

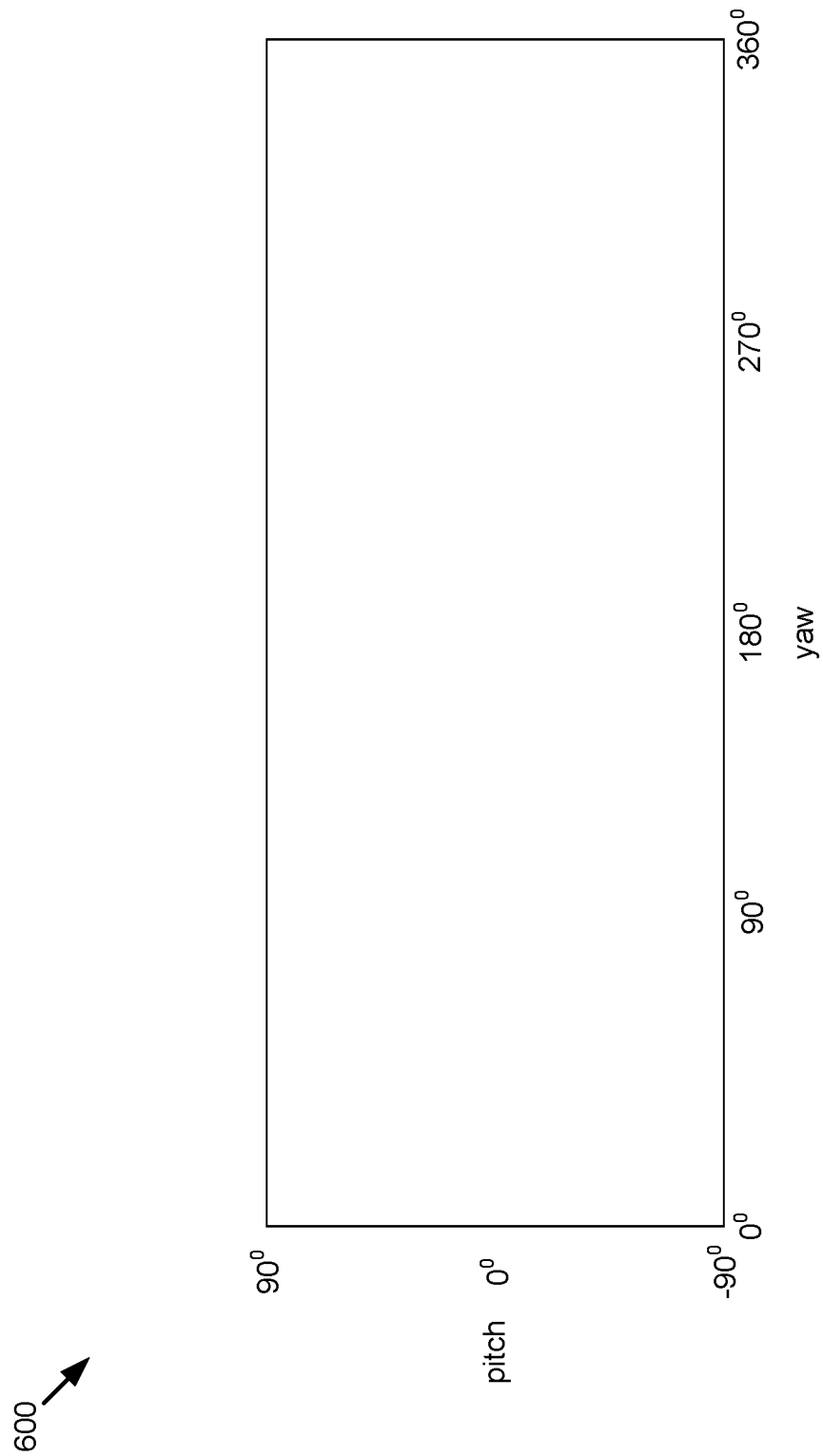

1000

Determine from a state file that processing of a first shard is complete, processing of a second shard is complete, and processing of a third shard is not complete or failed 1102

Receive a first virtual reality video render associated with the first shard and a second virtual reality video render associated with the second shard 1104

Generate a header from the first virtual reality video render, a first audio render that corresponds to the first virtual reality video render, a second virtual reality video render, a second audio render that corresponds to the second virtual reality video render, a filler video, and a third audio render that corresponds to the third shard 1106

Generate virtual reality content by concatenating the header, the first virtual reality video render, the first audio render, the second virtual reality video render, the second audio render, the filler video, and the third audio 1008

FIG. 11

USING SHARDING TO GENERATE VIRTUAL REALITY CONTENT

CROSS REFERENCE TO RELATED APPLICATIONS

This application claims the benefit of U.S. Provisional Patent Application No. 62/456,864, entitled "Processing of Audio and Video Data from Virtual Reality Camera Systems Through Sharding," filed Feb. 9, 2017, which is incorporated by reference.

FIELD

The embodiments discussed herein are related to using sharding generate virtual reality content. More particularly, the embodiments discussed herein relate to processing of audio and video data from different virtual reality camera systems through sharding.

BACKGROUND

Virtual reality content is becoming increasingly popular for both personal and business use. Virtual reality content includes 360-degree images of an environment that are stitched together from images received from discrete cameras. A virtual reality system that generates the virtual reality content may have difficulty in processing the images because of an abundance of virtual reality data. Previous attempts to solve this problem have included using a smaller number of cameras so that there is less virtual reality data to process. However, this results in virtual reality content with insufficient overall detail and/or virtual reality content that provides less than a 360-degree environment.

The subject matter claimed herein is not limited to embodiments that solve any disadvantages or that operate only in environments such as those described above. Rather, this background is only provided to illustrate one example technology area where some embodiments described herein may be practiced.

SUMMARY

According to one innovative aspect of the subject matter described in this disclosure, a method includes receiving raw virtual reality video data recorded by a camera array, wherein the camera array includes three or more camera modules. The method further includes defining shards of the raw virtual reality video data in a state file, wherein each shard includes three or more raw video feeds from the three or more camera modules. For example, the shards may include a first shard, a second shard, and a third share. The method further includes assigning each of the shards to a corresponding worker node in a set of worker nodes. For example, the first shard is assigned to a first worker node, the second shard is assigned to a second worker node, and the third shard is assigned to a third worker node. Each of the shards may comprise a set of corresponding segments of less than ninety seconds of each of the at least three raw video feeds of the raw virtual reality video data, each corresponding segment having a start time and an end time.

The method further includes updating the state file to include metadata that describes a location of each of the shards at the corresponding worker node in the set of worker nodes. For example, the state file includes metadata that describes that the first shard is assigned to a first worker node, the second shard is assigned to a second worker node, and the third shard is assigned to a third worker node. The method further includes providing the metadata to the set of worker nodes. The method further includes processing the shards to generate one or more virtual reality video renders for each shard, where each virtual reality video render combines the raw video feeds into a single video file.

The method may further include determining, from the state file, that processing of the first shard is complete, processing of the second shard is complete, and processing of the third shard is unsuccessful. Processing of the third shard may be unsuccessful because the third shard is still being processed by the worker node or the worker node failed to process the third share. The method may further include reassigning the third shard to one or more different worker nodes, updating the state file to indicate the location of the one or more different worker nodes that process the third shard, providing the metadata for the third shard to the one or more different worker nodes, and processing at the one or more different worker nodes the third shard to generate the one or more virtual reality video renders.

The method may include receiving a first virtual reality video render associated with the first shard and a second virtual video reality render associated with the second shard and generating virtual reality content by concatenating the first virtual reality video render, a first audio render associated with the first shard, the second virtual reality video render, and a second audio render associated with the second shard. In some embodiments, the concatenation may further include concatenating a filler video and a third audio render that corresponds to the third shard. In some embodiments, the concatenation may further include concatenating a fourth virtual reality video render associated with a fourth shard from a different set of raw video feeds and a fourth audio render that corresponds to the fourth shard. In some embodiments, the method may further include generating a header from the first virtual reality video render, the first audio render, the second virtual reality video render, the second audio render, the filler video, and the third audio render and the concatenation may further include concatenating the header.

Other aspects include corresponding methods, systems, apparatuses, and computer program products for these and other innovative aspects.

The object and advantages of the embodiments will be realized and achieved at least by the elements, features, and combinations particularly pointed out in the claims.

It is to be understood that both the foregoing general description and the following detailed description are exemplary and explanatory and are not restrictive of the disclosure, as claimed.

BRIEF DESCRIPTION OF THE DRAWINGS

Example embodiments will be described and explained with additional specificity and detail through the use of the accompanying drawings in which:

FIG. 6A is a graphic representation that illustrates an example panoramic image according to some embodiments.

FIG. 11 illustrates an example method for generating virtual reality content from virtual reality video renders according to some embodiments.

DETAILED DESCRIPTION

Example System

Figure 1:
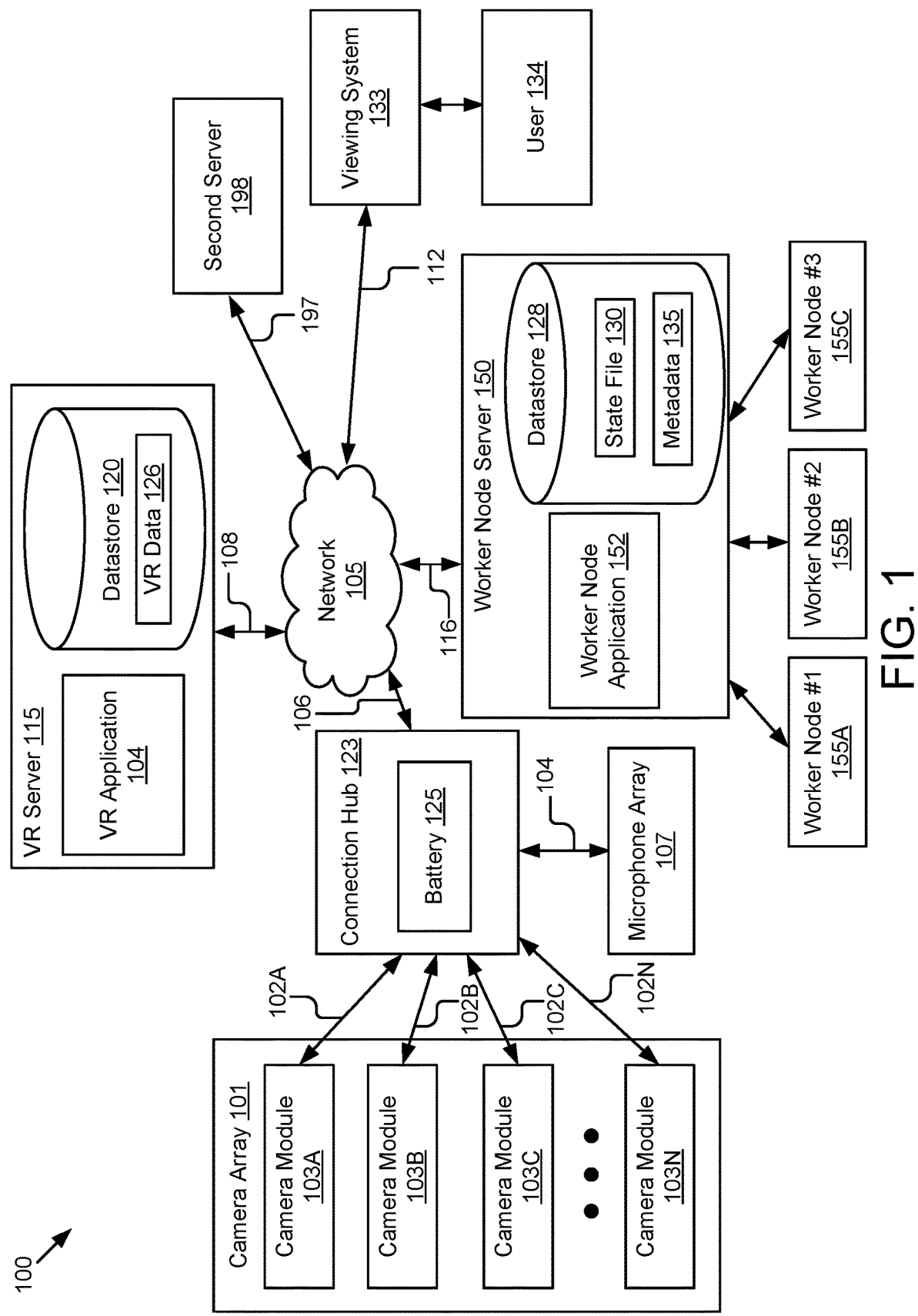
FIG. 1 illustrates a block diagram of a virtual reality system that generates virtual reality content using sharding according to some embodiments.

FIG. 1 illustrates a block diagram of a virtual reality system 100 that generates virtual reality content using sharding according to some embodiments. The virtual reality system 100 includes a camera array 101, a connection hub 123, a microphone array 107, a worker node server 150, a virtual reality server 115, a second server 198, and a viewing system 133. The connection hub 123, the worker node server 150, the virtual reality system 115, the second server 198, and the viewing system 133 may be communicatively coupled via a network 105.

The separation of various components and servers in the embodiments described herein should not be understood as requiring such separation in all embodiments, and it should be understood that the described components and servers may generally be integrated together in a single component or server. Additions, modifications, or omissions may be made to the illustrated embodiment without departing from the scope of the disclosure.

While FIG. 1 illustrates one camera array 101, one connection hub 123, one microphone array 107, one worker node server 150, one virtual reality server 115, one second server 198, and one viewing system 133, the disclosure applies to a system architecture having one or more camera arrays 101, one or more connection hubs 123, one or more microphone arrays 107, one or more worker nodes 150, one or more virtual reality servers 115, one or more second servers 198, one or more viewing systems 133, or any combination thereof. Furthermore, although FIG. 1 illustrates one network 105 coupled to the entities of the virtual reality system 100, in practice one or more networks 105 may be connected to these entities and one or more networks 105 may be of various and different types.

The camera array 101 may comprise a modular camera system configured to capture raw video data that includes image frames. In the illustrated embodiment shown in FIG. 1, the camera array 101 includes camera modules 103A, 103B, 103C, 103N (also referred to individually and collectively herein as the camera module 103). While four camera modules 103A, 103B, 103C, 103N are illustrated in FIG. 1, the camera array 101 may include any number of camera modules 103. The camera array 101 may be constructed using individual cameras with each camera module 103 including at least one individual camera. It is noted that camera modules 103 may comprise different virtual reality cameras (e.g., different camera makes, different camera models, etc.). For example, a first virtual reality camera module of the camera array 101 may comprise a first virtual reality camera make, a second virtual reality camera module of the camera array 101 may comprise a first model of a second, different virtual reality camera make, and a third virtual reality camera module of the camera array 101 may comprise a second, different model of the second virtual reality camera make. As another, more specific example, one or more virtual reality camera modules of the camera array 101 may include a GoPro™ camera rig (e.g., a 14 camera rig or a 16 camera rig), one or more virtual reality camera modules of the camera array 101 may include an OZO™ camera made by Nokia Technologies of Keilaniemi, Espoo, one or more virtual reality camera modules of the camera array 101 may include a Jaunt One™ camera made by Jaunt of Palo Alto, Calif., or any combination thereof.

In some embodiments, the camera array 101 may also include various sensors including, but not limited to, a depth sensor, a motion sensor (e.g., a global positioning system (GPS), an accelerometer, a gyroscope, etc.), a sensor for sensing a position of the camera array 101, and other types of sensors.

The camera array 101 may be constructed using various configurations. For example, camera modules 103A, 103B, 103C, 103N in the camera array 101 may be configured in different geometries (e.g., a sphere, a cylinder, a cone, a cube, etc.) with the corresponding lenses in the camera modules 103A, 103B, 103C, 103N facing toward different directions. The camera array 101 may comprise a flexible structure so that a particular the camera module 103 may be removed from the camera array 101 and new camera modules 103 may be added to the camera array 101.

In some embodiments, camera modules 103A, 103B, 103C, 103N in the virtual the camera array 101 may be oriented around a sphere in different directions with sufficient diameter and field of view to capture sufficient view disparity to render stereoscopic images. For example, the camera array 101 may include 32 Point Grey Blackfly Gigabit Ethernet cameras distributed around a 20-centimeter diameter sphere. Camera models that are different from the Point Grey Blackfly camera model may be included in the camera array 101.

In some embodiments, the camera array 101 may include a sphere whose exterior surface is covered in one or more optical sensors configured to render three-dimensional (3D) images or video. The optical sensors may be communicatively coupled to a controller. The entire exterior surface of the sphere may be covered in optical sensors configured to render 3D images or video.

According to some embodiments, camera modules 103 in the camera array 101 may be configured to have a sufficient field-of-view overlap so that all objects can be seen from more than one view point. For example, the horizontal field of view for each camera module 103 included in the camera array 101 is 70 degrees. In some embodiments, having the camera array 101 configured in such a way that an object may be viewed by more than one camera module 103 may be beneficial for correcting exposure or color deficiencies in the images captured by the camera array 101.

Camera modules 103 in the camera array 101 may or may not include built-in batteries. The camera modules 103 may obtain power from a battery 125 coupled to the connection hub 123. In some embodiments, the external cases of the camera modules 103 may be made of heat-transferring materials, such as metal, so that the heat in camera modules 103 may be dissipated more quickly than using other materials. In some embodiments, each camera module 103 may include a heat dissipation element. Examples of heat dissipation elements include, but are not limited to, heat sinks, fans, and heat-dissipating putty.

Each of the camera modules 103 may include one or more processors, one or more memory devices (e.g., a secure digital (SD) memory card, a secure digital high capacity (SDHC) memory card, a secure digital extra capacity (SDXC) memory card, and a compact flash (CF) memory card, etc.), an optical sensor (e.g., semiconductor charge-coupled devices (CCD), active pixel sensors in complementary metal-oxide-semiconductor (CMOS), and N-type metal-oxide-semiconductor (NMOS, Live MOS), etc.), a depth sensor (e.g., PrimeSense depth sensor), a lens (e.g., a camera lens), and other suitable components.

In some embodiments, camera modules 103A, 103B, 103C, 103N in the camera array 101 may form a daisy chain in which the camera modules 103A, 103B, 103C, 103N are connected in sequence. Camera modules 103A, 103B, 103C, 103N in the camera array 101 may be synchronized through the daisy chain. One camera module (e.g., the camera module 103A) in the daisy chain may be configured as a master camera module that controls clock signals for other camera modules 103 in the camera array 101. The clock signals may be used to synchronize operations (e.g., start operations, stop operations) of the camera modules 103 in the camera array 101. Through the synchronized start and stop operations of camera modules 103, the image frames in the respective video data captured by the respective camera modules 103A, 103B, 103C, 103N are also synchronized.

The camera modules 103 may be coupled to the connection hub 123. For example, the camera module 103A is communicatively coupled to connection hub 123 via signal line 102A, the camera module 103B is communicatively coupled to the connection hub 123 via signal line 102B, the camera module 103C is communicatively coupled to the connection hub 123 via signal line 102C, and the camera module 103N is communicatively coupled to the connection hub 123 via signal line 102N. In some embodiments, a signal line in the disclosure may represent a wired connection or any combination of wired connections such as connections using Ethernet cables, high-definition multimedia interface (HDMI) cables, universal serial bus (USB) cables, RCA cables, Firewire, CameraLink, or any other signal line suitable for transmitting video data and audio data. Alternatively, signal line in the disclosure may represent a wireless connection such as a wireless fidelity (Wi-Fi) connection or a Bluetooth® connection. In other embodiments, signal line may comprise a combination of a wired connection and a wireless connection.

The microphone array 107 may include one or more microphones configured to capture sounds from different directions in an environment. It is noted that the microphone array 107 may include different microphone systems (e.g., different makes and/or models of microphones). In some embodiments, the microphone array 107 may include one or more processors and one or more memories. The microphone array 107 may include a heat dissipation element. In the illustrated embodiment, the microphone array 107 is coupled to the connection hub 123 via signal line 104. Alternatively or additionally, the microphone array 107 may be directly coupled to other entities of the virtual reality system 100.

The microphone array 107 may be configured to capture sound from various directions. The sound may be stored as raw audio data on a non-transitory memory communicatively coupled to the microphone array 107, which may detect directionality of the sound. The directionality of the sound may be encoded and stored as part of the raw audio data.

In some embodiments, the microphone array 107 may include a Core Sound Tetramic soundfield tetrahedral microphone array following the principles of ambisonics, enabling reconstruction of sound from any arbitrary direction. For example, the microphone array 107 may include an ambisonics microphone mounted on top of the camera array 101 and used to record sound and sonic directionality. In some embodiments, the microphone array 107 includes a Joseph Grado HMP-1 recording system, or any other microphone system configured according to the same or similar acoustical principles.

In some embodiments, the camera modules 103 may be mounted around a camera housing (e.g., a spherical housing or a housing with another suitable shape). The microphone array 107 may include multiple microphones mounted around the same camera housing, with each microphone located in a different position. The camera housing may act as a proxy for the head-shadow sound-blocking properties of a human head. As described below with reference to FIG. 2, during playback of the recorded audio data, an audio module may select an audio track for a user's ear from a microphone that has a closest orientation to the user's ear. Alternatively, the audio track for the user's ear may be interpolated from audio tracks recorded by microphones that are closest to the user's ear.

The connection hub 123 may receive the raw audio data recorded by the microphone array 107 and forward the raw audio data to the virtual reality server 115 for storage. The connection hub 123 may also receive and aggregate streams of raw video data describing image frames captured by respective camera modules 103. The connection hub 123 may transfer the raw video data to the virtual reality server 115 for storage and to the worker node server 150 for processing.

The connection hub 123 is communicatively coupled to the network 105 via signal line 106. In some examples, the connection hub 123 may be a USB hub. In some embodiments, connection hub 123 includes one or more batteries 125 for supplying power to the camera modules 103 in the camera array 101. Alternatively or additionally, one or more batteries 125 may be coupled to the connection hub 123 for providing power to the camera modules 103.

The network 105 may be a conventional type, wired or wireless, and may have numerous different configurations including a star configuration, token ring configuration, or other configurations. Furthermore, the network 105 may include a local area network (LAN), a wide area network (WAN) (e.g., the Internet), or other interconnected data paths across which multiple devices may communicate. In some embodiments, the network 105 may be a peer-to-peer network. The network 105 may also be coupled to or include portions of a telecommunications network for sending data in a variety of different communication protocols. In some embodiments, the network 105 may include Bluetooth® communication networks or a cellular communication network for sending and receiving data including via short messaging service (SMS), multimedia messaging service (MMS), hypertext transfer protocol (HTTP), direct data connection, WAP, e-mail, etc.

The worker node server 150 may be a hardware device that includes a worker node application 152, a datastore 128, a processor, a memory, and network communication capabilities. The worker node server 150 is connected to the network 105 via signal line 116. The worker node server 150 may receive raw virtual reality data from the connection hub 123 via network 105. For example, the worker node server 150 may receive raw virtual reality video feeds generated by each of the camera modules 103A, 103B, 103C, 103N. The worker node server 150 may store the raw virtual reality data in the datastore 128 or each worker node 155A, 155B, 155C may store one of the raw virtual reality video feeds. The datastore 128 may also include a state file 130 and metadata 135.

The worker node application 152 may define shards of the raw virtual reality video data and record the shard designations in the state file 130. In addition, the worker node server 150 may assign each of the shards in the state file 130 to one of the worker nodes 155. When a worker node 155 completes the processing of raw virtual reality video data associated with a shard and generates one or more renders for the raw virtual reality video data, the worker node server 150 may record the completion of the processing in the state file 130. A render can include one or more segments stitched together in such a way to form virtual reality content that may be viewed on a virtual reality headset and/or allow 360 degree viewing of a scene. For example, a render may include video data for a stereoscopic virtual reality headset that allows for 360 views of a scene.

Alternately or additionally, the worker node application 152 may record the location of the one or more renders associated with a shard in the state file 130. If a worker node 155 fails to process a shard successfully, the worker node application 152 may record the failure in the state file 130 and may reassign the shard to another worker node 155. The worker node application 152 may store the state file 130 and the metadata 135 generated by the worker node 155 in the datastore 128. Although not illustrated, in some embodiments, each of the worker nodes 155 also stores a state file 130 and metadata 135 in a datastore on each of the worker nodes 155.

Worker nodes 155A, 155B, 155N (collectively and individually, worker node 155) may be hardware devices that each include a processor, a memory, and network communication capabilities. Although three worker nodes 155A, 155B, 155N are depicted in FIG. 1, the virtual reality system 100 may include many worker nodes 155. In some embodiments, each of the worker nodes 155 is a server that includes a database to advantageously share the load of the massive amount of raw virtual reality data that needs to be processed to generate virtual reality content.

Each of the worker nodes 155 may include software instructions that may cause the processor to execute instructions that process raw virtual reality data to generate one or more virtual reality video renders. Each of the worker nodes 155 may process the raw virtual reality video data associated with a different shard of the raw virtual reality video data that is assigned to it in the state file 130.

The worker node 155 may retrieve the metadata 135 associated with the shard assigned to the worker node 155 and retrieve the corresponding raw virtual reality video data from the datastore 128. For example, a second shard of the raw virtual reality video data may be assigned to the worker node 155B in the state file 130. The worker node 155B may retrieve the metadata 135 in the state file 130 related to the second shard of the raw virtual reality video data. The metadata 135 in the state file 130 may record that the second shard corresponds to video in raw virtual reality video feeds from a start time of 0:29.90 to an end time of 1:00.00 and may record the location of each of the raw virtual reality video feeds in the raw virtual reality video data. The worker node 155B may retrieve the raw virtual reality video feed corresponding to the video in the shard from the datastore 128. The worker node 155B may process the raw virtual reality video data to generate one or more virtual reality video renders corresponding to the video in the shard. The worker node 155B may store the one or more virtual reality video renders in the datastore 128 and/or transmit the one or more virtual reality video renders to the virtual reality server 115.

The datastore 128 may include the state file 130 and metadata 135. The state file 130 may contain metadata 135 related to shards of a raw virtual reality video data. For example, the state file 130 may contain metadata 135 describing a start time and an end time of each of the shards of the raw virtual reality video data. Additionally or alternatively, the state file 130 may contain metadata 135 relating to a number of head start frames associated with a shard. The state file 130 may contain a network location of each of the raw virtual reality video feeds that has been sharded. In addition, the state file 130 may contain an assignment of each shard to a corresponding worker node 155 in the worker node server 150. The metadata 135 may also comprise a status of a shard of the raw virtual reality video feed. The status may indicate that the processing of the shard is complete or is unsuccessful because the processing is in process, the processing failed, or any other status of the shard. The metadata 135 may also include a location of the virtual reality video render associated with a shard. For example, the metadata 135 may indicate a location of the virtual reality video render in the datastore 128.

The virtual reality server 115 may be a hardware server that includes a virtual reality application 104, a datastore 120, a processor, a memory, and network communication capabilities. In the illustrated embodiment, the virtual reality server 115 is coupled to the network 105 via signal line 108. The virtual reality server 115 sends and receives data to and from one or more of the other entities of the virtual reality system 100 via the network 105. For example, the virtual reality server 115 receives processed virtual reality data from the worker node server 150 and uses the processed virtual reality data to generate a virtual reality stream. In some embodiments, the virtual reality server 115 also receives raw virtual reality video data from the connection hub 123 and stores the raw virtual reality video data in the datastore 120. The processed virtual reality data, the raw virtual reality video data, and any virtual reality content generated by the virtual reality application 104 may be stored as virtual reality data 126 in the datastore 120.

The virtual reality server 115 may send the virtual reality content to the viewing system 133. Although the virtual reality server 115 is illustrated as being a separate component from the worker node server 150, in some embodiments, a single server performs all the functions performed by the virtual reality server 115 and the worker node server 150.

The virtual reality includes a virtual reality application 104. The virtual reality application 104 may aggregate virtual reality video renders and virtual reality audio renders to generate a virtual reality video stream and/or a virtual reality audio-video stream. In some embodiments, the virtual reality application 104 is be implemented using hardware including a field-programmable gate array ("FPGA") or an application-specific integrated circuit ("ASIC"). In some other embodiments, the virtual reality application 104 is implemented using a combination of hardware and software.

The virtual reality application 104 may be configured for concatenating virtual reality video renders generated by the worker nodes 155 and corresponding to the raw virtual reality video feeds of three or more camera modules 103 including two or more different camera systems. For example, the virtual reality application 104 may be configured to receive virtual reality video renders from a plurality of worker nodes 155 corresponding to a plurality of shards of the raw virtual reality video feed.

The raw virtual reality video feed may be from a variety of different cameras, such as a first camera system (e.g., a GoPro™ camera rig) and a second, different camera system (a Jaunt One™ camera made by Jaunt of Palo Alto, Calif.). The virtual reality application 104 may determine parameters for each camera system of the plurality of camera system and concatenate data from the plurality of virtual reality video renders of the plurality of shards based on the parameters.

The virtual reality application 104 may also concatenate the plurality of virtual reality video renders of the plurality of shards with the virtual reality audio render to generate a virtual reality audio-video stream. The virtual reality application 104 may combine the header information from the plurality of virtual reality video renders and the virtual reality audio render to generate a combined header for the virtual reality audio-video stream.

The second server 198 may be a hardware server that includes a processor, a memory, and network communication capabilities. In the illustrated embodiment, the second server 198 is coupled to the network 105 via signal line 197. The second server 198 sends and receives data to and from one or more of the other entities of virtual reality system 100 via network 105. The second server 198 may provide computer-generated imagery to the virtual reality application 104 for insertion into the stream so that live and computer-generated images may be combined. In other embodiments, the second server 198 may provide audio tracks that may be provided to the virtual reality application 104 for insertion into the stream so that live content includes an audio track. For example, the audio track may include a soundtrack.

In some embodiments, the second server 198 may be configured to modify the video or audio provided to the virtual reality application 104. For example, the second server 198 may include code and routines executed by a processor and configured to provide noise cancellation of audio, reverberation effects for audio, insertion of video effects, etc. Accordingly, the second server 198 may be configured to enhance or transform video and audio associated with the virtual reality application 104.

The viewing system 133 may include or use a computing device to decode and render a stream of 3D video data on a virtual reality display device (e.g., Oculus Rift VR display) or other suitable display devices that include, but is not limited to: augmented reality glasses; televisions, smartphones, tablets, or other devices with 3D displays and/or position tracking sensors; and display devices with a viewing position control, etc. The viewing system 133 may also decode and render a stream of 3D audio data on an audio reproduction device (e.g., a headphone or other suitable speaker devices). The viewing system 133 may include a virtual reality display configured to render the 3D video data and the audio reproduction device configured to render the 3D audio data. The viewing system 133 may be coupled to the network 105 via signal line 112. A user 134 may interact with the viewing system 133.

In some embodiments, the viewing system 133 may receive virtual reality content from the virtual reality server 115. The virtual reality content may include one or more of a stream of 3D video data, a stream of 3D audio data, a compressed stream of 3D video data, a compressed stream of 3D audio data, and other suitable content.

The viewing system 133 may track a head orientation of a user. For example, the viewing system 133 may include one or more accelerometers or gyroscopes used to detect a change in the orientation of the user's head. The viewing system 133 may decode and render the stream of 3D video data on a virtual reality display device and the stream of 3D audio data on a speaker system based on the head orientation of the user. As the user changes his or her head orientation, the viewing system 133 may adjust the rendering of the 3D video data and 3D audio data based on changes of the user's head orientation.

The viewing system 133 may provide an immersive viewing experience to the user 134. For example, the viewing system 133 may include a virtual reality display device that has a wide field of view so that the user 134 viewing the virtual reality content feels like he or she is surrounded by the virtual reality content in a manner similar to in a real-life environment. A complete 360-degree view of the scene is provided to the user 134, and the user 134 may view the scene in any direction. As the user 134 moves his or her head, the view is modified to match what the user 134 would see as if he or she were moving his or her head in the real world. By providing a different view to each eye (e.g., a stream of left panoramic images for left eye viewing and a stream of right panoramic images for right eye viewing), which simulates what the left and right eyes may see in the real world, the viewing system 133 may give the user 134 a 3D view of the scene. Additionally, 3D surrounding sound may be provided to the user 134 based on the user's head orientation to augment the immersive 3D viewing experience. For example, if a character in an immersive movie is currently behind the user 134, the character's voice may appear to be emanating from behind the user 134.

In some embodiments, the viewing system 133 includes a peripheral device such as a microphone, camera, mouse, or keyboard that is configured to enable the user 134 to provide an input to one or more components of the virtual reality system 100. For example, the user 134 may interact with the peripheral device to provide a status update to a social network service accessible through the network 105. In some embodiments, the peripheral device includes a camera such as the Microsoft® Kinect or another similar device, which allows the user 134 to provide gesture inputs to the viewing system 133 or other entities of the virtual reality system 100.

In some embodiments, the virtual reality system 100 includes two or more camera arrays 101 and two or more microphone arrays 107, and a user may switch between two or more viewpoints of two or more camera arrays 101. For example, the virtual reality system 100 may be used to record a live event such as a baseball game. The user may use the viewing system 133 to watch the baseball game from a first view point associated with a first camera array 101. A play is developing on the field and the user may want to switch viewpoints to have a better vantage of the play. The user may provide an input to the virtual reality application 104 via the viewing system 133, and the virtual reality application 104 may switch to a second camera array 101 that provides a better vantage of the play. The second camera array 101 may be associated with a different microphone array 107 that provides different sound to the user 134 specific to the user's 134 new vantage point.

Example Computing Device

Figure 2:
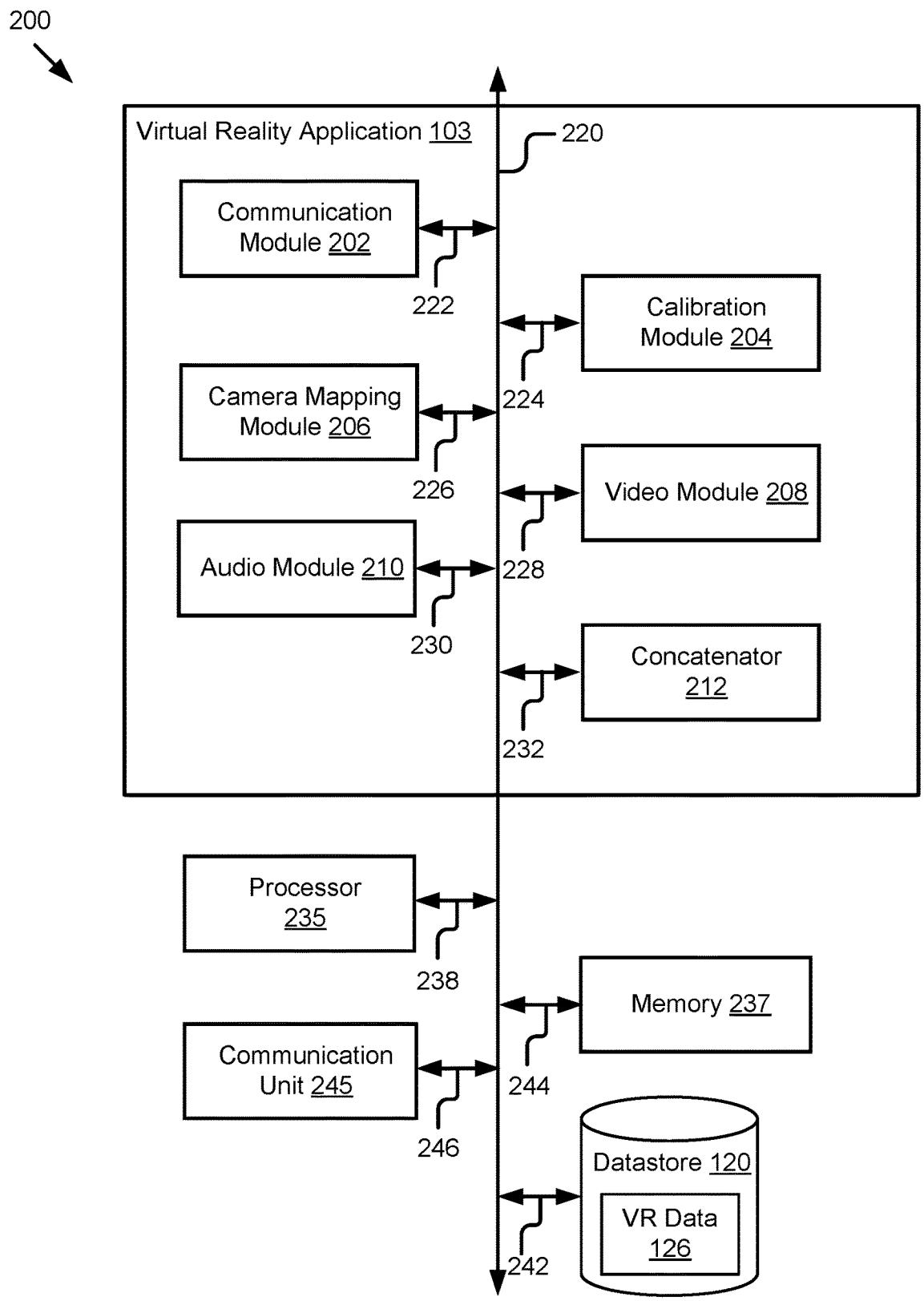
FIG. 2 illustrates a block diagram of a computing device that generates virtual reality content using sharding according to some embodiments.

FIG. 2 illustrates a block diagram of a computing device 200 that generates virtual reality content using sharding according to some embodiments. In some embodiments, the computing device 200 may be the virtual reality server 115, the worker node server 150, or a combination of the virtual reality server 115 and the worker node server 150 illustrated in FIG. 1.

FIG. 2 is a block diagram of a computing device 200 that includes a virtual reality application 104, a processor 235, a memory 237, a communication unit 245, and the datastore 120. In the illustrated embodiment, the components of computing device 200 are communicatively coupled via a bus 220.

The processor 235 may include an arithmetic logic unit, a microprocessor, a general-purpose controller, or some other processor array to perform computations and provide electronic display signals to a display device. The processor 235 is coupled to the bus 220 for communication with the other components via signal line 238. The processor 235 may process data signals and may include various computing architectures including a complex instruction set computer (CISC) architecture, a reduced instruction set computer (RISC) architecture, or an architecture implementing a combination of instruction sets. Although FIG. 2 includes a single processor 235, multiple processors may be included. Other processors, operating systems, sensors, displays, and physical configurations may be possible.

The memory 237 includes a non-transitory memory that stores data for providing the functionality described herein. The memory 237 may be a dynamic random access memory (DRAM) device, a static random access memory (SRAM) device, flash memory, or some other memory devices. In some embodiments, the memory 237 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis. The memory 237 may store the code, routines, and data for the virtual reality application 104 to provide its functionality. The memory 237 is coupled to the bus 220 via signal line 244.

The communication unit 245 may transmit data to any of the entities of the virtual reality system 100 depicted in FIG. 1. Similarly, the communication unit 245 may receive data from any of the entities of the virtual reality system 100 depicted in FIG. 1. The communication unit 245 may include one or more Ethernet switches for receiving the processed virtual reality video data from the worker node server 150 and the raw audio data from the connection hub 123. The communication unit 245 is coupled to the bus 220 via signal line 246.

In some embodiments, the communication unit 245 includes a port for direct physical connection to the network 105 of FIG. 1, or to another communication channel. For example, the communication unit 245 may include a port such as a USB, SD, RJ45, or similar port for wired communication with another computing device. In some embodiments, the communication unit 245 includes a wireless transceiver for exchanging data with another computing device or other communication channels using one or more wireless communication methods, including IEEE 802.11, IEEE 802.16, Bluetooth®, or another suitable wireless communication method.

In some embodiments, the communication unit 245 includes a cellular communications transceiver for sending and receiving data over a cellular communications network including via short messaging service (SMS), multimedia messaging service (MMS), hypertext transfer protocol (HTTP), direct data connection, WAP, e-mail, or another suitable type of electronic communication. In some embodiments, the communication unit 245 includes a wired port and a wireless transceiver. The communication unit 245 also provides other conventional connections to a network for distribution of data using standard network protocols including TCP/IP, HTTP, HTTPS, and SMTP, etc.

The datastore 120 may be a non-transitory storage medium that stores data for providing the functionality described herein. The datastore 120 may be a dynamic random access memory (DRAM) device, a static random access memory (SRAM) device, flash memory, or some other memory devices. In some embodiments, the datastore 120 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis. The datastore 120 is communicatively coupled to bus 220 via signal line 242.

In the embodiment illustrated in FIG. 2, the virtual reality application 104 includes a communication module 202, a calibration module 204, a camera mapping module 206, a video module 208, an audio module 210, and a concatenator 212.

In some embodiments, each module of the virtual reality application 104 (e.g., modules 202, 204, 206, 208, 210, or 212) may include a respective set of instructions executable by the processor 235 to provide its respective functionality, as described herein. In some embodiments, each module of the virtual reality application 104 may be stored in the memory 237 of the computing device 200 and may be accessible and executable by the processor 235. Each module of the virtual reality application 104 may be adapted for cooperation and communication with the processor 235 and other components of the computing device 200.

The communication module 202 may be software including routines for handling communications between the virtual reality application 104 and other components of the computing device 200. The communication module 202 may be communicatively coupled to the bus 220 via signal line 222. The communication module 202 sends and receives data, via the communication unit 245, to and from one or more of the entities of virtual reality system 100 depicted in FIG. 1. For example, the communication module 202 may receive virtual reality data 126 from the worker node server 150 via the communication unit 245 and may forward the virtual reality data 126 to the video module 208. In another example, the communication module 202 may receive a virtual reality video stream from the concatenator 212 and may send the virtual reality video stream to the viewing system 133 via the communication unit 245.

In some embodiments, the communication module 202 receives data from components of the virtual reality application 104 and stores the data in the memory 237 or the datastore 120. For example, the communication module 202 receives virtual reality content from the concatenator 212 and stores the virtual reality content in the datastore 120 as virtual reality data 126. In some embodiments, the communication module 202 retrieves data from the memory 237 or the datastore 120 and sends the data to one or more components of the virtual reality application 104. Alternatively or additionally, the communication module 202 may also handle communications between components of the virtual reality application 104.

The calibration module 204 may be software including routines for calibrating the virtual reality video data received from camera modules 103 in the camera array 101. The calibration module 204 may be adapted for cooperation and communication with the processor 235 and other components of the computing device 200 via signal line 224.

According to various embodiments, the calibration module 204 may determine one or more parameters for each camera module 103 within the camera array 101. For example, the calibration module 204 may access stored parameters for each camera module 103 (e.g., in the memory 237). Further, if required (e.g., due to a lack of information regarding a specific camera module), parameters of a camera module 103 may be received prior to, during, or after receiving virtual reality video data from the specific camera module 103. As an example, a user may input the parameters (e.g., via an electronic device). In another example, uploaded video data from a specific camera module 103 may include metadata comprising parameters for the specific camera module 103. As will be appreciated, one or more parameters for camera modules 103 may be used for distortion correction, rendering of virtual reality video data, and/or stitching of virtual reality video data.

In some embodiments, lenses included in the camera modules 103 may have some amount of spherical distortion. Images captured with the camera modules 103 may have a barrel distortion or a pin-cushion distortion that needs to be corrected during creation of panoramic images from the distorted images. The barrel distortion may be referred to as a "fish eye effect." For each camera module 103, the calibration module 204 may calibrate a lens in a corresponding the camera module 103 to determine associated distortion caused by the lens. For example, a snapshot of a test pattern that has known geometries placed in a known location (e.g., a checkerboard in a known location) may be captured by the camera module 103. The calibration module 204 may determine properties of a lens included in the camera module 103 from the snapshot of the test pattern. Properties of a lens may include, but are not limited to, distortion parameters, an optical center, and other optical properties associated with the lens.

The calibration module 204 may store data describing the properties of each lens in a configuration file. The configuration file may include data describing properties of all lenses of all the camera modules 103 in the camera array 101. For example, the configuration file includes data describing distortion parameters, an optical center, and other optical properties for each lens in the camera array 101.

Alternatively or additionally, the calibration module 204 may perform multi-camera geometric calibration on the camera array 101 to determine variations in the physical properties of the camera array 101. For example, the calibration module 204 may determine slight variations in camera orientation for each lens in the camera array 101, where the slight variations in the camera orientation may be caused by human errors occurring during an installation or manufacture process of the camera array 101. In another example, the calibration module 204 may estimate errors in the predicted roll, pitch, and yaw of a corresponding lens in each camera module 103. The calibration module 204 may determine a position and a rotational offset for the corresponding lens in each camera module 103 and may store the position and the rotational offset for the corresponding lens in the configuration file. As a result, the relative position of two lenses in the camera array 101 may be determined based on the positions and rotational offsets of the two corresponding lenses. For example, spatial transformation between each two lenses may be determined based on the positions and rotational offsets of the two corresponding lenses.

The camera mapping module 206 may comprise software including routines for constructing a left camera map and a right camera map. The camera mapping module 206 may be adapted for cooperation and communication with the processor 235 and other components of the computing device 200 via signal line 226.

A two-dimensional (2D) spherical panoramic image may be used to represent a panorama of an entire scene. As described below with reference to the video module 208, two stereoscopic panorama images may be generated for two eyes to provide a stereoscopic view of the entire scene. For example, a left panoramic image may be generated for the left eye viewing and a right panoramic image may be generated for the right eye viewing. An example panoramic image is illustrated in FIG. 6A.

A pixel in a panoramic image may be presented by a yaw value and a pitch value. Yaw represents rotation around the center and may be represented on the horizontal x-axis as:

$$yaw = 360° \times x/width. \tag{1}$$

Yaw has a value between 0° and 360°. Pitch represents up or down rotation and may be represented on the vertical y-axis as:

$$pitch = 90° \times (height/2 - y)/(height/2). \tag{2}$$

Pitch has a value between −90° and 90°.

The panoramic images may give a sense of real depth by exploiting a human brain's capacity to transform disparity (e.g., shifts in pixel positions) into depth. For example, a nearby object may have a larger disparity than a far-away object. Disparity may represent pixel shifts in positions between two images. Disparity may be caused by an interocular distance which represents a distance between two eyes. Each eye may receive a slightly different image, which creates a sense of depth.

Typical stereoscopic systems (e.g., 3D movies) may respectively show two different planar images to two eyes to create a sense of depth. In each planar image, all pixels in the image represent a single eye viewing position. For example, all pixels in the planar image may represent a view into the same viewing direction. However, in the panoramic image described herein (the left or right panoramic image), each pixel in the panoramic image may represent a view into a slightly different direction. For example, a pixel at a position with yaw∈[0°,360°] and pitch=0° in a left panoramic image may represent an eye viewing position of the left eye as the head is rotated to the position indicated by the yaw value and the pitch value. Similarly, a pixel at the position with yaw∈[0°,360°] and pitch=0° in a right panoramic image represents an eye viewing position of the right eye as the head is rotated to the position indicated by the yaw value and the pitch value. For pitch=0° (i.e., no up and down rotations), as the head is rotated from yaw=0° to yaw=360°, a blended panorama for eye viewing positions with all 360-degree head rotations in the horizontal axis may be produced.

In some embodiments, the blended panorama is effective for head rotations along the horizontal axis (e.g., yaw) but not for the vertical axis (e.g., pitch). As a user tilts his or her head upwards or downwards (e.g., pitch≠0°), the dominant orientation of the user's eyes with respect to points on the sphere may become less well defined compared to pitch=0°. For example, when the user looks directly upward with pitch=90°, the orientation of the user's eyes with respect to the north pole point of the sphere may be completely ambiguous since the user's eyes may view the north pole point of the sphere from any yaw. Stereo vision may not be supported in the upward and downward directions using left/right eye spheres that are supported in the horizontal orientation. As a result, binocularity may be phased out by diminishing the interocular distance with an adjustment function f(pitch). An output of the adjustment function f(pitch) may decline from 1 to 0 as the pitch increases from 0° to 90° or decreases from 0° to −90°. For example, the adjustment function f(pitch) may include cos(pitch). The interocular distance may be adjusted based on the adjustment function f(pitch). For example, the interocular distance associated with the pitch may be adjusted as:

$$\text{interocular distance} = \max(\text{interocular distance}) \times f(\text{pitch}), \quad (3)$$

wherein max(interocular distance) represents the maximum value of the interocular distance (e.g., the interocular distance is at its maximum when pitch=0°).

If f(pitch)=cos(pitch), then the interocular distance may be expressed as:

$$\text{interocular distance} = \max(\text{interocular distance}) \times \cos(\text{pitch}). \quad (4)$$

In some examples, the maximum value of the interocular distance may be about 60 millimeters. In other examples, the maximum value of the interocular distance may have a value greater than 60 millimeters or less than 60 millimeters.

The camera mapping module 206 may construct a left camera map that identifies a corresponding matching camera module 103 for each pixel in a left panoramic image. For example, for a pixel in a left panoramic image that represents a point in a panorama, the left camera map may identify a matching camera module 103 that has a best view for the point in the panorama compared to other camera modules 103. Thus, the left camera map may map pixels in a left panoramic image to matching camera modules 103 that have best views for the corresponding pixels. Determination of a matching camera module 103 for a pixel is described below in more detail.

Figure 6B:
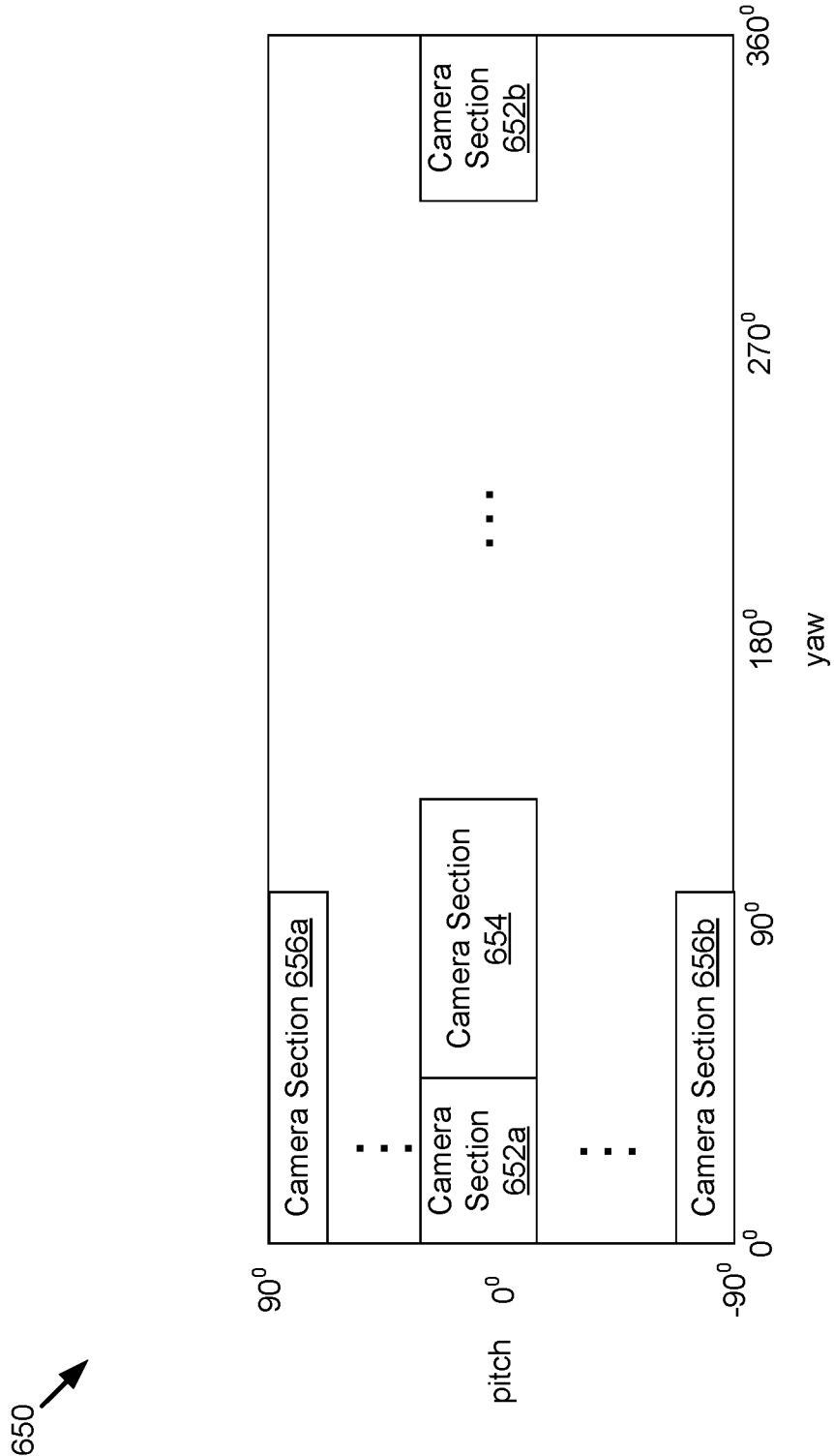
FIG. 6B is a graphic representation that illustrates an example camera map according to some embodiments.

An example camera map is illustrated in FIG. 6B. A camera map may include a left camera map or a right camera map. A camera map may use (yaw, pitch) as an input and may generate an output of (an identifier of a matching camera module 103, x, y), indicating a pixel (yaw, pitch) in a panoramic image may be obtained as a pixel (x, y) in an image plane of the identified matching camera module 103. The camera map may store the output (an identifier of a matching camera module, x, y) in a map entry related to the input (yaw, pitch). Pixels in an image plane of a camera module may be determined by using a camera model (e.g., a pinhole camera model or more complex lens model) to map points in 3D space onto pixels in the image plane of the camera module, where the points in the 3D space are assumed to be at a particular distance from the camera module. For example, referring to FIG. 7A, a distance for a point 716 may refer to a distance from point 716 to a center of the camera array 101. The distance may be set at a fixed radius or varied as a function of pitch and yaw. The distance may be determined by: (1) measuring the scene; (2) manual adjustment by a human operator; (3) using a depth sensor to measure depths of the points in the 3D space; or (4) determining the depths using stereo disparity algorithms.

For each pixel in a left panoramic image that represents a point in a panorama, the camera mapping module 206 may determine a yaw, a pitch, and an interocular distance using the above mathematical expressions (1), (2), and (3), respectively. The camera mapping module 206 may use the yaw and pitch to construct a vector representing a viewing direction of the left eye (e.g., a left viewing direction) to the corresponding point in the panorama.

In some embodiments, a matching camera module 103 for a pixel in a left panoramic image that has a better view of the pixel may have a viewing direction to a point in a panorama that corresponds to the pixel in the left panoramic image. The viewing direction of the matching camera module 103 is closer to the left viewing direction than other viewing directions of other camera modules 103 to the same point in the panorama. For example, referring to FIG. 7A, the viewing direction 714 of matching camera module 103A is more parallel to a left viewing direction 704 than other viewing directions of other camera modules 103. In other words, for each pixel in the left panoramic image, the left camera map may identify a corresponding matching camera module 103 that has a viewing direction most parallel to the left viewing direction than other viewing directions of other camera modules 103. Illustrations of a matching camera module 103 with a more parallel viewing direction to a left viewing direction are illustrated with reference to FIGS. 7A and 7B.

Similarly, the camera mapping module 206 may construct a right camera map that identifies a corresponding matching camera module 103 for each pixel in a right panoramic image. For example, for a pixel in a right panoramic image that represents a point in a panorama, the right camera map may identify a matching camera module 103 that has a better view for the point in the panorama than other camera modules 103. Thus, the right camera map may map pixels in a right panoramic image to matching camera modules 103 that have better views for the corresponding pixels.

For each pixel in a right panoramic image that represents a point in a panorama, the camera mapping module 206 may determine a yaw, a pitch, and an interocular distance using the above mathematical expressions (1), (2), and (3), respectively. The camera mapping module 206 may use the yaw and pitch to construct a vector representing a viewing direction of the right eye (e.g., a right viewing direction) to the corresponding point in the panorama.

In some embodiments, a matching camera module 103 for a pixel in a right panoramic image that has a better view of the pixel may have a viewing direction to a point in a panorama that corresponds to the pixel in the right panoramic image. The viewing direction of matching camera module 103 is closer to the right viewing direction than other viewing directions of other camera modules 103 to the same point in the panorama. For example, the viewing direction of matching camera module 103 is more parallel to the right viewing direction than other viewing directions of other camera modules 103. In other words, for each pixel in the right panoramic image, the right camera map may identify a corresponding matching camera module 103 that has a viewing direction most parallel to the right viewing direction than other viewing directions of other camera modules 103.

Since the physical configuration of the camera array 101 is fixed, the left and right camera maps are the same for different left panoramic images and right panoramic images, respectively. The left and right camera maps may be pre-computed and stored to achieve a faster processing speed compared to an on-the-fly computation.

The video module 208 may comprise software including routines for generating a stream of 3D video data configured to render 3D video when played back on the viewing system 133. The video module 208 may be adapted for cooperation and communication with the processor 235 and other components of computing device 200 via signal line 228. The stream of 3D video data may describe a stereoscopic panorama of a scene that may vary over time. The stream of 3D video data may include a stream of left panoramic images for left eye viewing and a stream of right panoramic images for right eye viewing.

In some embodiments, the video module 208 may receive virtual reality data 126 from the worker node server 150 that describes image frames from various camera modules 103 in the camera array 101. The virtual reality data 126 may be processed shards of virtual reality video data, such as virtual reality video renders. In some embodiments, the virtual reality data 126 also includes a state file 130 and metadata 135. The video module 208 identifies a location and timing associated with each of camera modules 103 and synchronizes the image frames based on locations and timings of camera modules 103. The video module 208 synchronizes corresponding image frames that are captured by different camera modules 103 at the same time. In some embodiments, the video module 208 uses the state file 130 and the metadata 135 included in the virtual reality data 126 to determine the locations of the processed shards of virtual reality video data in the virtual reality data 126.

For example, the video module 208 receives a first stream of image frames generated by a first camera module 103 and a second stream of image frames generated by a second camera module 103. The video module 208 identifies that the first camera module 103 is located at a position with yaw=$0°$ and pitch=$0°$ and the second camera module 103 is located at a position with yaw=$30°$ and pitch=$0°$. The video module 208 synchronizes the first stream of image frames with the second stream of image frames by associating a first image frame from the first stream captured at a first particular time $T=T_0$ with a second image frame from the second stream captured at the same particular time $T=T_0$, a third image frame from the first stream captured at a second particular time $T=T_1$ with a fourth image frame from the second stream captured at the same particular time $T=T_1$, and so on and so forth.

In some embodiments, the video module 208 may correct calibration errors in the synchronized image frames. For example, the video module 208 may correct lens distortion, orientation errors, and rotation errors, etc., in the image frames.

The video module 208 may receive a left camera map and a right camera map from the camera mapping module 206. Alternatively, the video module 208 may retrieve the left and right camera maps from the memory 237 or the datastore 120. The video module 208 may construct a stream of left panoramic images from the image frames based on the left camera map. For example, the video module 208 identifies matching camera modules 103 listed in the left camera map. The video module 208 constructs a first left panoramic image $PI_{L,0}$ by stitching image frames that are captured by matching camera modules 103 at a first particular time $T=T_0$. The video module 208 constructs a second left panoramic image $PI_{L,1}$ by stitching image frames that are captured by matching camera modules 103 at a second particular time $T=T_1$, and so on and so forth. The video module 208 constructs the stream of left panoramic images to include the first left panoramic image $PI_{L,0}$, the second left panoramic image $PI_{L,1}$, and other constructed left panoramic images.

Specifically, for a pixel in a left panoramic image $PI_{L,i}$ at a particular time $T=T_i$ ($i=0, 1, 2, \ldots$), the video module 208: (1) identifies a matching camera module 103 from the left camera map; and (2) configures the pixel in the left panoramic image $PI_{L,i}$ to be a corresponding pixel from an image frame that is captured by matching camera module 103 at the particular time $T=T_i$. The pixel in the left panoramic image $PI_{L,i}$ and the corresponding pixel in the image frame of matching camera module 103 may correspond to the same point in the panorama. For example, for a pixel location in the left panoramic image $PI_{L,i}$ that corresponds to a point in the panorama, the video module 208: (1) retrieves a pixel that also corresponds to the same point in the panorama from the image frame that is captured by matching camera module 103 at the particular time $T=T_i$; and (2) places the pixel from the image frame of the matching camera module 103 into the pixel location of the left panoramic image $PI_{L,i}$.

Similarly, the video module 208 may construct a stream of right panoramic images from the image frames based on the right camera map by performing operations similar to those described above with reference to the construction of the stream of left panoramic images. For example, the video module 208 may identify matching camera modules 103 listed in the right camera map. The video module 208 may construct a first right panoramic image $PI_{R,0}$ by stitching image frames that are captured by matching camera modules 103 at a first particular time $T=T_0$. The video module 208 may construct a second right panoramic image $PI_{R,1}$ by stitching image frames that are captured by the matching camera modules 103 at a second particular time $T=T_1$, and so on and so forth. The video module 208 may construct the stream of right panoramic images to include the first right panoramic image $PI_{R,0}$, the second right panoramic image $PI_{R,1}$, and other constructed right panoramic images.

Specifically, for a pixel in a right panoramic image $PI_{R,i}$ at a particular time $T=T_i$ ($i=0, 1, 2, \ldots$), the video module 208: (1) identifies a matching camera module 103 from the right camera map; and (2) configures the pixel in the right panoramic image $PI_{R,i}$ to be a corresponding pixel from an image frame that is captured by matching camera module 103 at the particular time $T=T_i$. The pixel in the right panoramic image $PI_{R,i}$ and the corresponding pixel in the image frame of matching camera module 103 may correspond to the same point in the panorama.

In some embodiments, the video module 208 may construct pixels in a left or right panoramic image by blending pixels from image frames of multiple camera modules 103 according to weights associated with multiple camera modules 103.

In some embodiments, the left and right panoramic images may be optimized for stereoscopic viewing in a horizontal plane (e.g., yaw∈$[0°, 360°]$ and pitch=$0°$). Alternatively or additionally, the left and right panoramic images may be optimized based on a user's viewing direction. For example, the video module 208 may adaptively construct the streams of left panoramic images and right panoramic images based on the user's current viewing direction. A panorama provided by the streams of left and right panoramic images may have a high-resolution in the user's current viewing direction and a low-resolution in a reverse viewing direction. This panorama may be referred to as a directional panorama. As the user rotates his or her head to view the panorama in a new viewing direction, the directional panorama may be adjusted to have a high resolution in the new viewing direction and a low resolution in a viewing direction opposite to the new viewing direction. Since only a directional panorama is constructed, bandwidth and other resources may be saved compared to constructing a full high-resolution panorama. However, quality of the 3D viewing experience is not affected if the user does not change viewing directions rapidly.

In some embodiments, a constructed left or right panoramic image may have color deficiencies. For example, since the lenses in camera modules 103 may point to different directions, light and color conditions may vary for the different lenses. Some image frames taken by some camera modules 103 may be over-exposed while some other image frames taken by other camera modules 103 may be under-exposed. The exposure or color deficiencies between image frames from different camera modules 103 may be corrected during a construction process of the left or right panoramic image.

Additionally or alternatively, due to the disparity between neighboring camera modules 103, a constructed left or right panoramic image may have stitching artifacts (or, stitching errors) where the viewpoint switches from a camera module 103 to a neighboring the camera module 103. Objects that are far away from camera modules 103 may have negligible disparity and there may be no stitching errors for the far-away objects. However, objects that are near camera modules 103 may have noticeable disparity and there may be stitching errors for the nearby objects.

In some embodiments, the video module 208 corrects aberrations in image frames or panoramic images. The aberrations may include calibration errors, exposure or color deficiencies, stitching artifacts, and other types of aberrations. The stitching artifacts may include errors made by the video module 208 when stitching image frames from various camera modules 103 to form a left or right panoramic image. The video module 208 may analyze the image frames or the panoramic images to identify the aberrations. The video module 208 may process the image frames or panoramic images to mask or correct the aberrations. The video module 208 may automatically correct the aberrations or provide an administrator of concatenator 140 with tools or resources to manually correct the aberrations.

In some embodiments, the video module 208 may receive image frames captured by a camera module 103 and correct calibration errors on the image frames. For example, the video module 208 may correct lens distortion (e.g., barrel or pin-cushion distortion) and camera orientation errors in the image frames based on lens distortion parameters, a position, and a rotational offset associated with the camera module 103.

In another example, the video module 208 may analyze the image frames captured by the camera module 103, determine the calibration errors present in the image frames, and determine calibration factors used to calibrate the camera module 103. The calibration factors may include data used to automatically modify the image frames captured by the camera module 103 so that the image frames include fewer errors. In some embodiments, the calibration factors are applied to the image frames by the video module 208 so that the image frames include no errors that are detectable during user consumption of the virtual reality content. For example, the video module 208 may detect the deficiencies in the image frames caused by the calibration errors. The video module 208 may determine one or more pixels associated with the deficiencies. The video module 208 may determine the pixel values associated with these pixels and then modify the pixel values using the calibration factors so that the deficiencies are corrected. In some embodiments, the calibration factors may also be provided to an administrator of the camera array 101 who uses the calibration factors to manually correct the calibration deficiencies of the camera array 101.

In some embodiments, the video module 208 may detect and correct exposure or color deficiencies in the image frames captured by the camera array 101. For example, the video module 208 may determine one or more pixels associated with the exposure or color deficiencies. The video module 208 may determine the pixel values associated with these pixels and then modify the pixel values so that the exposure or color deficiencies are not detectable by user 134 during consumption of the virtual reality content using the viewing system 133. In some embodiments, camera modules 103 of the camera array 101 may have overlapping fields of view, and exposure or color deficiencies in the image frames captured by the camera array 101 may be corrected or auto-corrected using this overlap. In other embodiments, exposure or color deficiencies in the image frames captured by the camera array 101 may be corrected using calibration based on color charts of known values.

In some embodiments, the video module 208 may correct stitching errors caused by close-by objects. For example, the closer an object is to the camera array 101, the greater the difference of a viewing angle from each camera module 103 to the object. Close-by objects that cross a stitching boundary may abruptly transition between viewing angles and may thus produce an obvious visual discontinuity. This may be referred to herein as the "close object problem." Stitching artifacts may be incurred for close-by objects. One example mechanism to reduce the stitching errors may include increasing the number of camera modules 103 distributed throughout a spherical housing case of the camera array 101 to approach an ideal of a single, continuous, and spherical image sensor. The mechanism may reduce the viewing angle discrepancy between neighboring cameras and may thus reduce the stitching artifacts. Alternatively, virtual cameras may be interpolated between real cameras to simulate an increasing camera density so that stitching artifacts may be reduced. Image stitching using virtual cameras is described in more detail in U.S. application Ser. No. 14/465,581, titled "Image Stitching" and filed Aug. 21, 2014, which is incorporated herein in its entirety by reference.

The audio module 210 may comprise software including routines for generating a stream of 3D audio data configured to render 3D audio when played back on an audio reproduction device. The audio module 210 may be communicatively coupled to the bus 220 via signal line 230. The audio module 210 may generate the 3D audio data based on raw virtual reality audio data received from the microphone array 107. It is noted that the audio module 210 may generate the 3D audio data based on the raw virtual reality audio data received from different microphones systems (e.g., different makes and/or different microphone models) of one or more microphone arrays 107. In some embodiments, the audio module 210 may process the raw audio data to generate four-channel ambisonic audio tracks corresponding to raw virtual reality video data or rendered virtual video data. The audio module 210 may process the raw audio data to generate a virtual reality audio render.

The four-channel ambisonic audio tracks may provide a compelling 3D 360-degree audio experience to the user 134. In some embodiments, the four-channel audio tracks may be recorded in an "A" format by the microphone array 107 such as a Tetramic microphone. The audio module 210 may transform the "A" format four-channel audio tracks to a "B" format that includes four signals: W, X, Y, and Z. The W signal may represent a pressure signal that corresponds to an omnidirectional microphone, and the X, Y, Z signals may correspond to directional sounds in front-back, left-right, and up-down directions, respectively. In some embodiments, the "B" format signals may be played back in a number of modes including, but not limited to, mono, stereo, binaural, surround sound including four or more speakers, and any other modes. In some examples, an audio reproduction device may include a pair of headphones, and the binaural playback mode may be used for the sound playback in the pair of headphones. The audio module 210 may convolve the "B" format channels with Head Related Transfer Functions (HRTFs) to produce binaural audio with a compelling 3D listening experience for the user 134.

In some embodiments, the audio module 210 may generate 3D audio data that is configured to provide sound localization to be consistent with the user's head rotation. For example, if a sound is emanating from the user's right-hand side and the user rotates to face the sound, the audio reproduced during consumption of the virtual reality content sounds as if it is coming from in front of the user.

In some embodiments, the raw audio data is encoded with the directionality data that describes the directionality of the recorded sounds. The audio module 210 may analyze the directionality data to produce 3D audio data that changes the sound reproduced during playback based on the rotation of the user's head orientation. For example, the directionality of the sound may be rotated to match the angle of the user's head position. Assume that the virtual reality content depicts a forest with a canopy of tree limbs overhead. The audio for the virtual reality content includes the sound of a river. The directionality data indicates that the river is behind user 134, and so the 3D audio data generated by the audio module 210 is configured to reproduce audio during playback that makes the river sound as if it is located behind the user 134. This is an example of the 3D audio data being configured to reproduce directionality. Upon hearing the audio for the river, the user 134 may sense that the river is behind him or her. The 3D audio data is configured so that as the user 134 tilts his or her head to the side, the sound of the water changes. As the angle of the tilt approaches 180 degrees relative to the starting point, the river sounds as though it is in front of the user 134. This is an example of the 3D audio data being configured to reproduce directionality based on the angle of the user's 134 head position. The 3D audio data may be configured so that the sound of the river becomes more distinct and clearer, and the user 134 has a better sense of how far the water is from the user 134 and how fast the water is flowing.

The concatenator 212 may comprise software including routines for combining a stream of 3D video data and a stream of 3D audio data to generate virtual reality content. The concatenator 212 is communicatively coupled to the bus 220 via signal line 232. The stream of 3D video data may include a stream of left panoramic images for left eye viewing and a stream of right panoramic images for right eye viewing. Redundancy may exist between the stream of left panoramic images and the stream of right panoramic images.

The concatenator 212 may compress the stream of left panoramic images and the stream of right panoramic images to generate a stream of compressed 3D video data using video compression techniques. In some embodiments, within each stream of the left or right panoramic images, the concatenator 212 may use redundant information from one frame to a next frame to reduce the size of the corresponding stream. For example, with reference to a first image frame (e.g., a reference frame), redundant information in the next image frames may be removed to reduce the size of the next image frames. This compression may be referred to as temporal or inter-frame compression within the same stream of left or right panoramic images.

Alternatively or additionally, the concatenator 212 may use one stream (either the stream of left panoramic images or the stream of right panoramic images) as a reference stream and may compress the other stream based on the reference stream. This compression may be referred to as inter-stream compression. For example, the concatenator 212 may use each left panoramic image as a reference frame for a corresponding right panoramic image and may compress the corresponding right panoramic image based on the referenced left panoramic image.

In some embodiments, the concatenator 212 may encode the stream of 3D video data (or compressed 3D video data) and 3D audio data to form virtual reality content. For example, the concatenator 212 may compress the stream of 3D video data using H.264 and the stream of 3D audio data using advanced audio coding (AAC). In another example, the concatenator 212 may compress the stream of 3D video data and the stream of 3D audio data using a standard MPEG format. The concatenator 212 may generate the virtual reality content by generating a header and concatenating the stream of 3D video data with the stream of 3D audio data.

In some embodiments, the concatenator 212 may package the virtual reality content in a container format such as MP4, WebM, VP8, and any other suitable format. The virtual reality content may be stored as virtual reality data 126 in the datastore 120 and may be streamed to viewing system 133 for the user 134 from the virtual reality server 115. Alternatively, the virtual reality content may not be stored and may be generated on the fly in the concatenator 212 from the virtual reality video renders generated by the worker nodes 155. Alternatively, the virtual reality content may be stored on a digital versatile disc (DVD), a flash memory, or another type of storage device.

Example Sharding

Figure 3A:
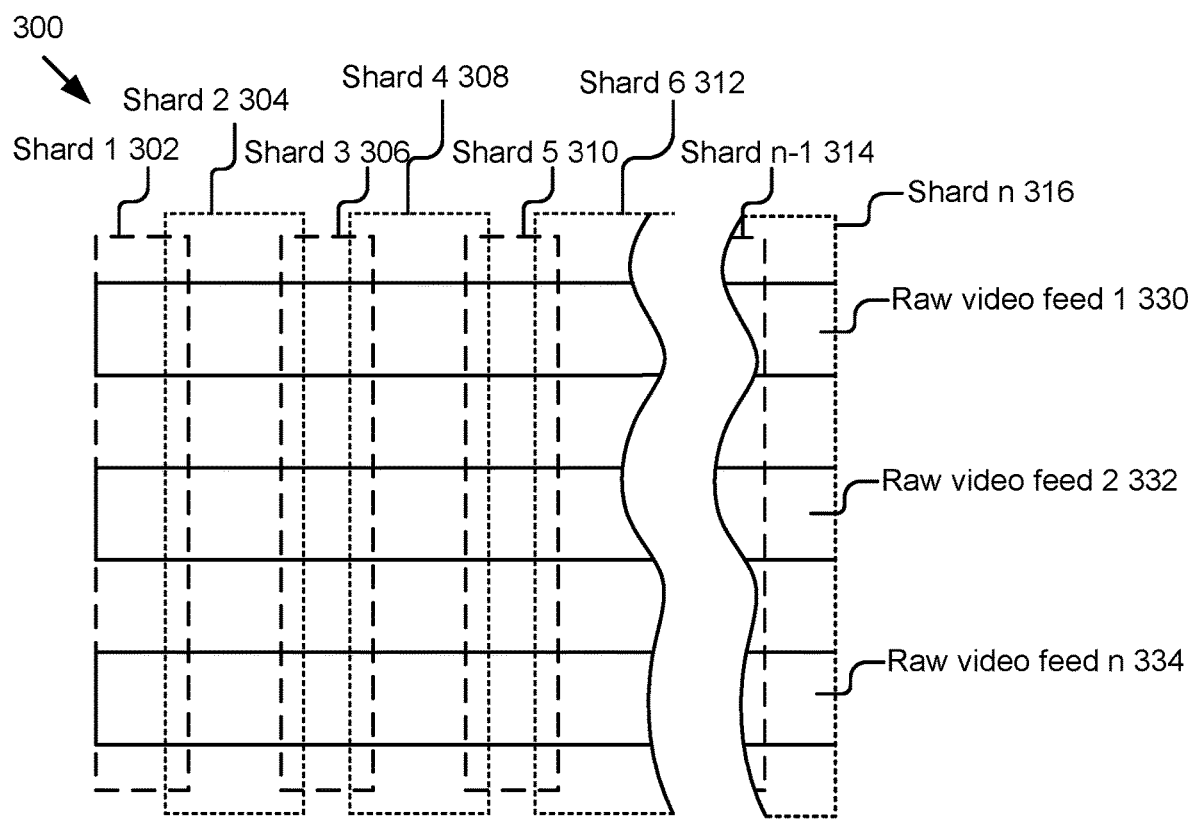
FIG. 3A illustrates an example of shards of raw virtual reality video data according to some embodiments.

Referring now to FIG. 3A, an example block diagram of a collection of shards 300 for raw video feeds is described according to some embodiments.

The collection of shards 300 includes a raw video feed 1 330, a raw video feed 2 332, and a raw video feed n 334. Raw video feed 1 330 may be a raw video feed from the camera module 103A of FIG. 1. Raw video feed 2 332 may be a raw video feed from the camera module 103B of FIG. 1. Raw video feed n 334 may be a raw video feed from the camera module 103N of FIG. 1.

Each of the shards may not be stored as a separate file or video file. Each shard in the collection of shards 300 may include metadata 135 stored in the state file 130. For example, the metadata 135 may describe a start time for each shard in the collection of shards 300, an end time for each shard in the collection of shards 300, and additional information regarding each shard.

The collection of shards 300 may have a shard 1 302. The shard 1 302 may start at the beginning of each of the raw video feeds and may be the first ninety seconds of each video feed. For example, the shard 1 302 may be the video from 0:00.00 to 1:30.00 of the raw video feed 1 330, the video from 0:00.00 to 1:30.00 of the raw video feed 2 332, and the video from 0:00.00 to 1:30.00 of the raw video feed n 334.

The collection of shards 300 may have a shard 2 304. As illustrated in FIG. 3A, the video corresponding to the shard 2 304 may overlap with the video corresponding to the shard 1 302. For example, the shard 2 304 may be the video from 1:29.90 to 3:00.00 of the raw video feed 1 330, the video from 1:29.90 to 3:00.00 of the raw video feed 2 332, and the video from 1:29.90 to 3:00.00 of the raw video feed n 334.

The collection of shards 300 may have a shard 3 306. As illustrated in FIG. 3A, the video corresponding to the shard 3 306 may overlap with the video corresponding to the shard 2 304. For example, the shard 3 306 may be the video from 2:59.90 to 4:30.00 of the raw video feed 1 330, the video from 2:59.90 to 4:30.00 of the raw video feed 2 332, and the video from 2:59.90 to 4:30.00 of the raw video feed n 334.

The collection of shards 300 may have a shard 4 308. As illustrated in FIG. 3A, the video corresponding to the shard 4 308 may overlap with the video corresponding to the shard 3 306. For example, the shard 4 308 may be the video from 4:29.90 to 6:00.00 of the raw video feed 1 330, the video from 4:29.90 to 6:00.00 of the raw video feed 2 332, and the video from 4:29.90 to 6:00.00 of the raw video feed n 334.

The collection of shards 300 may have a shard 5 310. As illustrated in FIG. 3A, the video corresponding to the shard 5 310 may overlap with the video corresponding to the shard 4 308. For example, the shard 5 310 may be the video from 5:59.90 to 7:30.00 of the raw video feed 1 330, the video from 5:59.90 to 7:30.00 of the raw video feed 2 332, and the video from 5:59.90 to 7:30.00 of the raw video feed n 334.

The collection of shards 300 may have a shard 6 312. As illustrated in FIG. 3A, the video corresponding to the shard 6 312 may overlap with the video corresponding to the shard 5 310. For example, the shard 6 312 may be the video from 7:29.90 to 9:00.00 of the raw video feed 1 330, the video from 7:29.90 to 9:00.00 of the raw video feed 2 332, and the video from 7:29.90 to 9:00.00 of the raw video feed n 334.

The collection of shards 300 may have a shard n−1 314. The video corresponding to the shard n−1 314 may overlap with the video corresponding to a shard n−2 (not shown in FIG. 3A). For example, the shard n−1 314 may be the video from 59:59.90 to 61:30.00 of the raw video feed 1 330, the video from 59:59.90 to 61:30.00 of the raw video feed 2 332, and the video from 59:59.90 to 61:30.00 of the raw video feed n 334.

The collection of shards 300 may have a shard n 316. As illustrated in FIG. 3A, the video corresponding to the shard n 316 may overlap with the video corresponding to the shard n−1 314. For example, the shard n 316 may be the video from 61:29.90 to 62:45.57 of the raw video feed 1 330, the video from 61:29.90 to 62:45.57 of the raw video feed 2 332, and the video from 61:29.90 to 62:45.57 of the raw video feed n 334.

The collection of shards 300 may correspond to the entire video from the raw video feed 1 330, the entire video from the raw video feed 2 332, and the entire video from the raw video feed n 334. For example, if the raw video feed 1 330, the raw video feed 2 332, and the raw video feed n 334 is each a video from 0:00.00 to 62:45.57, each frame of the video would be in at least one of the shards of the collection of shards 300.

For example, each shard in the collection of shards 300 may have four frames from the preceding shard. The four frames from the preceding shard may not be in the virtual reality video render or the virtual reality audio-video render. The four frames from the preceding shard may be head start frames. The head start frames may be used to determine information regarding the estimate of motion but may not appear as part of the shard after processing. Because the frames appear in the preceding shard, the frames may not be repeated after processing.

Figure 3B:
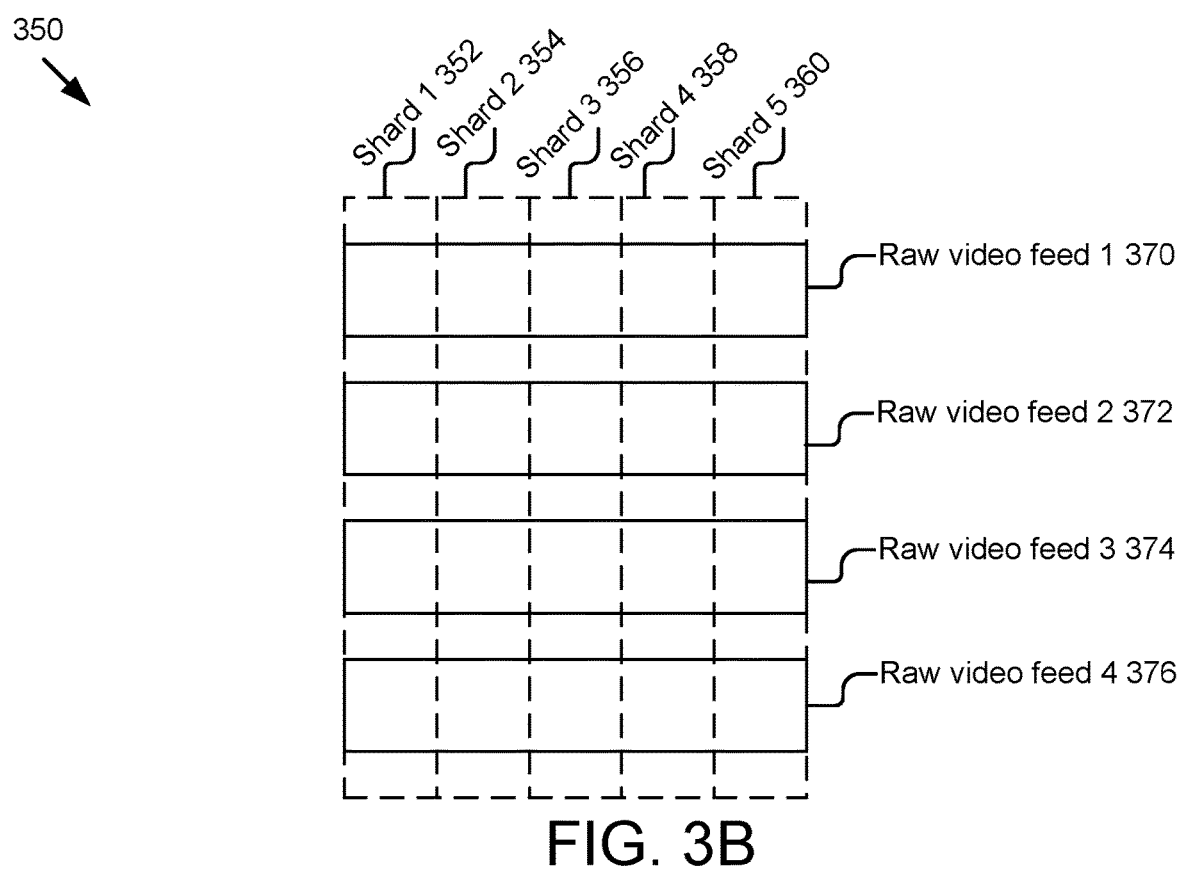
FIG. 3B illustrates a second example of shards of raw virtual reality video data according to some embodiments.

Referring now to FIG. 3B, a second example collection of shards 350 for raw video feeds is described according to some embodiments.

The collection of shards 300 includes a raw video feed 1 370, a raw video feed 2 372, a raw video feed 3 374, and a raw video feed 4 376. The raw video feed 1 370 may be a raw video feed from the camera module 103A of FIG. 1. The raw video feed 2 372 may be a raw video feed from the camera module 103B of FIG. 1. The raw video feed 3 376 may be a raw video feed from the camera module 103C of FIG. 1. The raw video feed 4 378 may be a raw video feed from a camera module 103D of FIG. 1.

Each of the shards may not be stored as a separate file or video file. Each shard in the collection of shards 350 may include metadata 135 stored in the state file 130. For example, the metadata 135 may describe a start time for each shard in the collection of shards 350, an end time for each shard in the collection of shards 350, and additional information regarding each shard.

The collection of shards 350 may have a shard 1 352. Shard 1 352 may start at the beginning of each of the raw video feeds and may be the first sixty seconds of each video feed. For example, the shard 1 352 may be the video from 0:00.00 to 1:00.00 of the raw video feed 1 370, the video from 0:00.00 to 1:00.00 of the raw video feed 2 372, the video from 0:00.00 to 1:00.00 of the raw video feed 3 374, and the video from 0:00.00 to 1:00.00 of the raw video feed 4 376.

The collection of shards 350 may have a shard 2 354. For example, the shard 2 352 may be the video from 1:00.00 to 2:00.00 of the raw video feed 1 370, the video from 1:00.00 to 2:00.00 of the raw video feed 2 372, the video from 1:00.00 to 2:00.00 of the raw video feed 3 374, and the video from 1:00.00 to 2:00.00 of the raw video feed 4 376.

The collection of shards 350 may have a shard 3 356. For example, the shard 3 356 may be the video from 2:00.00 to 3:00.00 of the raw video feed 1 370, the video from 2:00.00 to 3:00.00 of the raw video feed 2 372, the video from 2:00.00 to 3:00.00 of the raw video feed 3 374, and the video from 2:00.00 to 3:00.00 of the raw video feed 4 376.

The collection of shards 350 may have a shard 4 358. For example, the shard 4 358 may be the video from 3:00.00 to 4:00.00 of the raw video feed 1 370, the video from 3:00.00 to 4:00.00 of the raw video feed 2 372, the video from 3:00.00 to 4:00.00 of the raw video feed 3 374, and the video from 3:00.00 to 4:00.00 of the raw video feed 4 376.

The collection of shards 350 may have a shard 5 360. For example, the shard 5 360 may be the video from 4:00.00 to 4:23.81 of the raw video feed 1 370, the video from 4:00.00 to 4:23.81 of the raw video feed 2 372, the video from 4:00.00 to 4:23.81 of the raw video feed 3 374, and the video from 4:00.00 to 4:23.81 of the raw video feed 4 376.

The collection of shards 350 may correspond to the entire video from the raw video feed 1 370, the entire video from the raw video feed 2 372, the entire video from the raw video feed 3 374, and the entire video from the raw video feed 4 376. For example, if the raw video feed 1 370, the raw video feed 2 372, the raw video feed 3 374, and the raw video feed 4 376 are each a video from 0:00.00 to 4:23.81, each frame of the video would be in at least one of the shards of the collection of shards 350.

In some embodiments, each shard in the collection of shards 350 may be a video segment that is 0.5 seconds long. Each raw video feed in the raw virtual video data may be a series of i-frames, p-frames, and b-frames. In the raw video feed, i-frames may be decoded without using other video frames. P-frames may use data from previous frames to decompress. B-frames may use data from previous frames and data from succeeding frames to decompress. For example, the raw video feed may have an i-frame, followed by a p-frame, followed by a b-frame, followed by a p-frame, followed by a b-frame. The pattern of i-frame, p-frame, b-frame, p-frame, and b-frame may repeat itself throughout the video file. Alternatively or additionally, other patterns of i-, p-, and b-frames may be used. A group of pictures may be a repeating pattern of i-, p-, and b-frames. Each shard may correspond to one group of pictures in the raw video feed. Each shard in the collection of shards may begin with an i-frame, which may not use any other frames to decode.

While a worker node 155 is processing a shard, another video processing task may receive a higher priority than task that is currently being processed. In such a case, the worker node 155 may terminate the processing of the current shard and switch to the higher priority processing task.

Figure 4A:
FIGS. 4A and 4B are a tabular representation that illustrates an example state file with shards of raw virtual reality video feed according to some embodiments.

FIG. 4A is a graphic representation of a state file 400. The state file 400 may be a listing of every shard associated with the raw virtual reality data. In this illustrate, the state file 400 is a record of three shards, 1, 2, and 3. Each of the shards 1, 2, and 3 is associated with raw video feed 1 and raw video feed 2. The state file 400 includes metadata corresponding to each of the shards 1, 2, and 3. In this illustration, the metadata includes a start time and an end time for each of the shards.

For example, in FIG. 4A the state file 400 indicates that the shard 1 has the start time of 0:00.00 and the end time of 0:30.00 for each of the raw video feed 1 and the raw video feed, shard 2 has the start time of 0:29.90 and the end time of 1:00.00 for each of the raw video feed 1 and the raw video feed 2, and shard 3 has the start time of 0:59.90 and the end time of 1:21.40 for each of the raw video feed 1 and the raw video feed 2.

The state file 400 may also have a number of head start frames associated with each of the shards 1, 2, and 3. A head start frame may be a frame in the video that is also associated with another shard. In this example, the state file 400 indicates that shard 1 has zero head start frames. The state file 400 indicates that shard 2 has six head start frames. In addition, as discussed above, shard 2 has a start time of 0:29.90, which overlaps with the end time of shard 1, which may be 0:30.00. Shard 2 may include six frames of video, from 0:29.90 to 0:30.00, which are also associated with shard 1. The state file 400 may also indicate that shard 3 has six head start frames. In addition, as discussed above, shard 3 has a start time of 0:59.90, which overlaps with the end time of shard 2, which is 1:00.00. Shard 3 includes six frames of video, from 0:59.90 to 1:00.00, that are also associated with shard 2.

The state file 400 may indicate a worker node 155 that processed a particular shard. For example, in FIG. 4A shard 1 is assigned to worker node 7, shard 2 is assigned to worker node 8, and shard 3 is assigned to worker node 27. The worker node 155 may include Worker Node #1 155A, Worker Node #2 155B, or Worker Node # n 155C as depicted in FIG. 1. The metadata 135, such as the names and locations of the raw video feed files, the start time and the end time of the video, and the number of head start frames, may be provided to the assigned worker node 155. The worker node 155 may then retrieve the video data associated with the node based on the metadata 135 provided.

The state file 400 may indicate a status of each shard. When the assigned worker node 155 has processed the video associated with a shard, the state file 400 may indicate that the processing of the shard is complete. When the assigned worker node 155 is still processing the video associated with a shard, the state file 400 may indicate that the processing of the shard is in progress. When the assigned worker node 155 has failed to process the video associated with a shard, the state file 400 may indicate that the processing of the shard is failed. Alternately or additionally, the state file 400 may indicate that the assigned worker node 155 has not begun to process the video associated with a shard, that the video associated with a shard has been reassigned to another worker node 155, or any other status related to the processing of the video. In FIG. 4A, the state file 400 indicates that worker node 7 completed the processing of shard 1, worker node 8 is currently processing the video associated with shard 2, and worker node 27 has failed to process the video associated with shard 3.

Figure 4B:

FIG. 4B depicts another example state file 450. The state file 450 indicates a status of the processing of the video associated with each shard. For example, the state file 450 indicates that the processing of the video associated with shard 1 is complete, the processing of the video associated with shard 2 is complete, the processing of the video associated with shard 3 is in progress, the processing of the video associated with shard 4 is complete, and the processing of the video associated with shard 5 is failed.

The state file 450 may indicate a location of the processed video. For example, the state file 450 indicates that the video file for the processed video associated with shard 1 is located at networkdrive#1\s00001.mp4, the video file associated with shard 2 is located at networkdrive#2\s00002.mp4, and the video file associated with shard 4 is located at networkdrive#7\s00004.mp4. Because shard 3 is still being processed by a worker node 155, there is no video file and therefore no location of a video file. Similarly, because the processing of shard 5 failed, there is no location of a video file.

Example Generation of a Virtual Reality Stream

Figure 5:
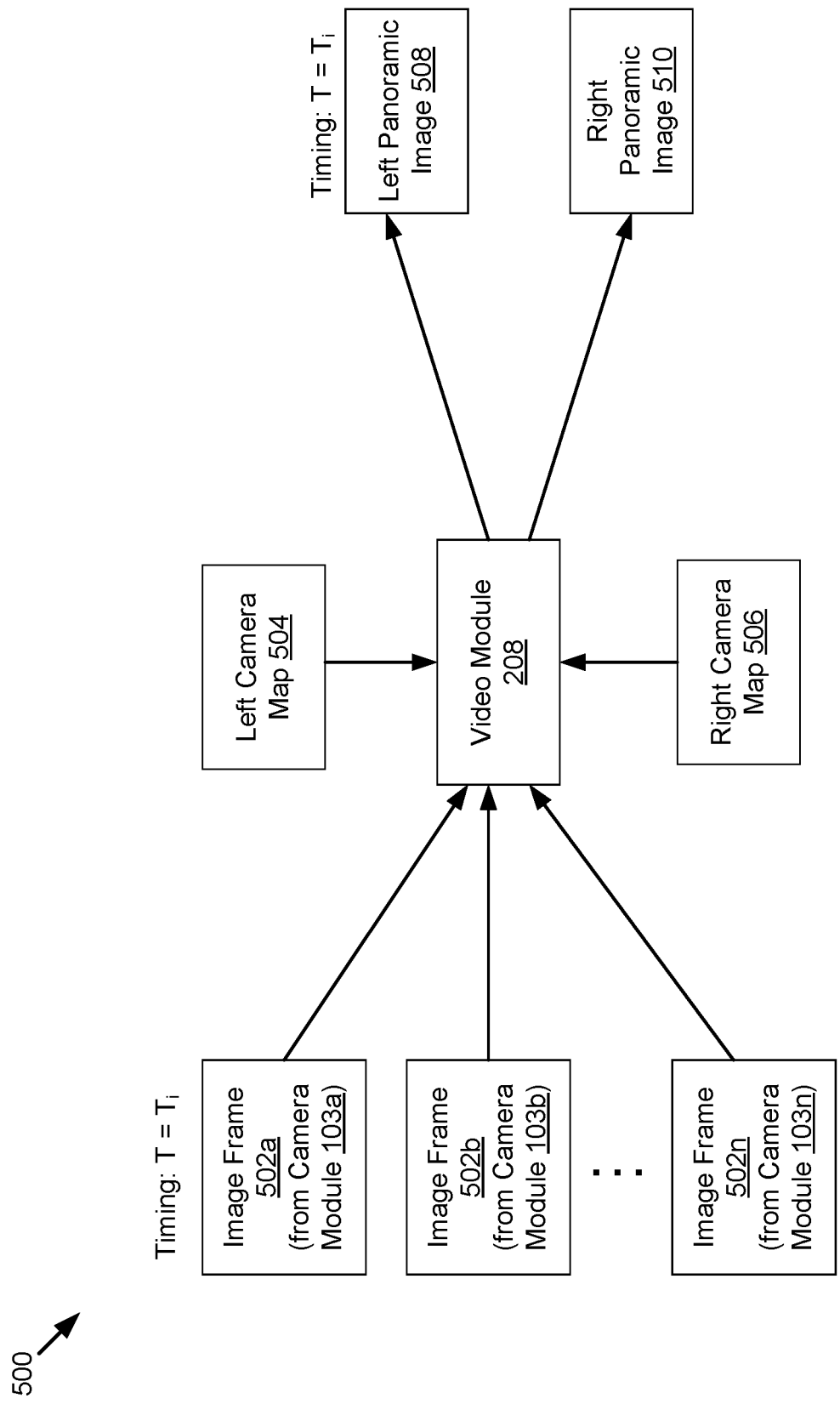
FIG. 5 illustrates an example process of generating a left panoramic image and a right panoramic image from multiple image frames that are captured by multiple camera modules at a particular time according to some embodiments.

FIG. 5 illustrates an example process 500 of generating a left panoramic image and a right panoramic image from multiple image frames that are captured by multiple camera modules 103A, 103B, 103N at a particular time, arranged in accordance with at least some embodiments described herein. At the particular time $T=T_i$ (i=0, 1, 2, . . . ), the camera module 103A captures an image frame 502a, the camera module 103B captures an image frame 502b, and the camera module 103N captures an image frame 502n. The video module 208 receives image frames 502a, 502b, and 502n. The video module 208 aggregates image frames 502a, 502b, and 502n to generate a left panoramic image 508 based on a left camera map 504 and a right panoramic image 510 based on a right camera map 506. Left panoramic image 508 and right panoramic image 510 are associated with the particular time $T=T_i$.

FIG. 6A is a graphic representation 600 illustrating an example panoramic image, arranged in accordance with at least some embodiments described herein. The panoramic image has a first axis "yaw" which represents rotation in a horizontal plane and a second axis "pitch" which represents up and down rotation in a vertical direction. The panoramic image covers an entire 360-degree sphere of a scene panorama. A pixel at a position [yaw, pitch] in the panoramic image represents a point in a panorama viewed with a head rotation having a "yaw" value and a "pitch" value. Thus, the panoramic image includes a blended view from various head rotations rather than a single view of the scene from a single head position.

FIG. 6B is a graphic representation 650 illustrating an example camera map, arranged in accordance with at least some embodiments described herein. The example camera map matches first pixels in camera sections 652a and 652b of a panoramic image to a first matching camera module 103, second pixels in a camera section 654 to a second matching camera module 103, and third pixels in camera sections 656a and 656b to a third matching camera module 103. For the first pixels of the panoramic image within camera sections 652a and 652b, values for the first pixels may be configured to be corresponding pixel values in a first image frame captured by first matching camera module 103. Similarly, for the second pixels of the panoramic image within camera section 654, values for the second pixels may be configured to be corresponding pixel values in a second image frame captured by second matching camera module 103. For the third pixels of the panoramic image within camera sections 656a and 656b, values for the third pixels may be configured to be corresponding pixel values in a third image frame captured by third matching camera module 103. In this example, the panoramic image is stitched using part of the first image frame from first matching camera module 103, part of the second image frame from second matching camera module 103, part of the third image frame from third matching camera module 103, and part of other image frames from other matching camera modules 103.

Figure 7A:
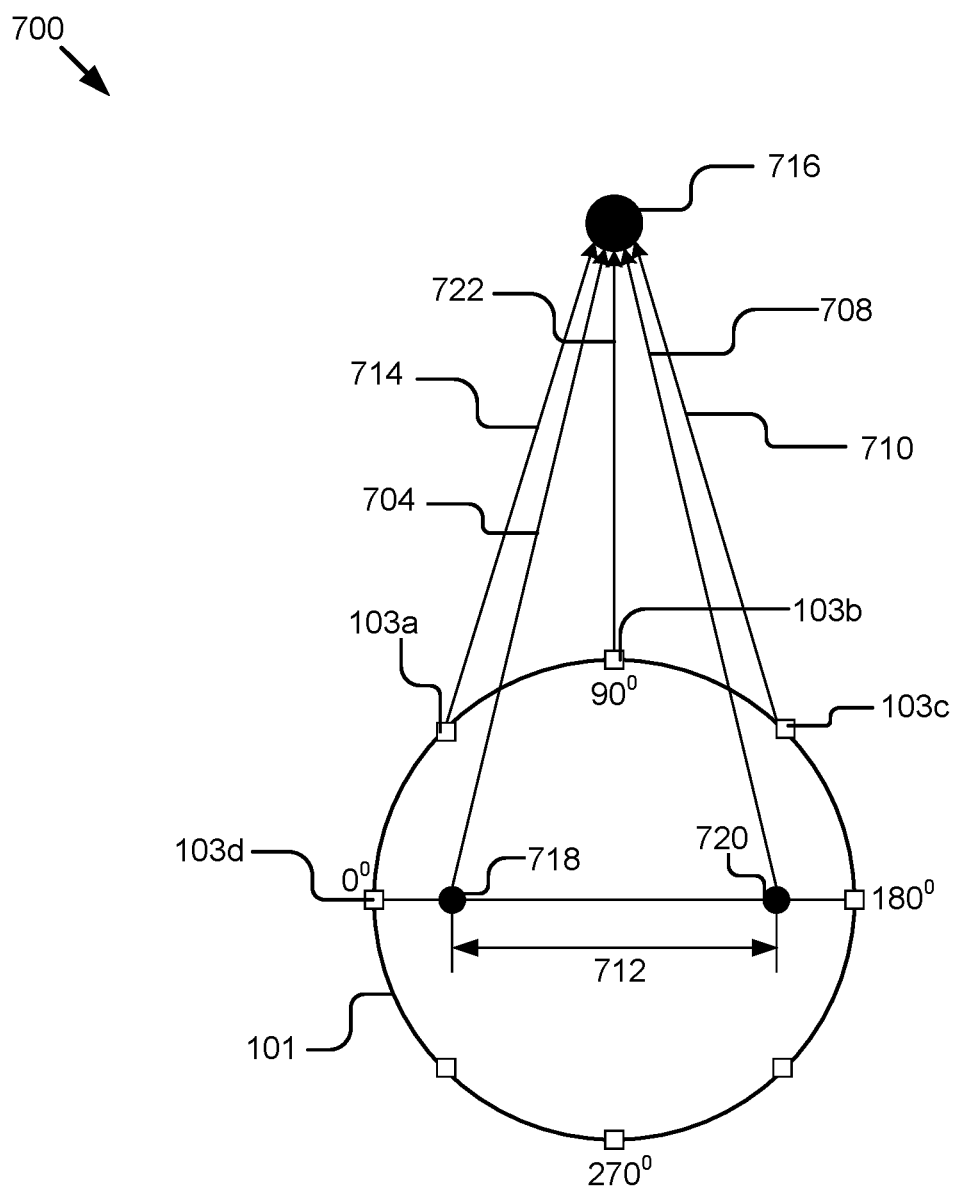
FIGS. 7A and 7B are graphic representations that illustrate example processes of selecting a first camera module for a pixel in a left panoramic image to construct a left camera map and selecting a second camera module for the pixel in a right panoramic image to construct a right camera map according to some embodiments.
Figure 7B:
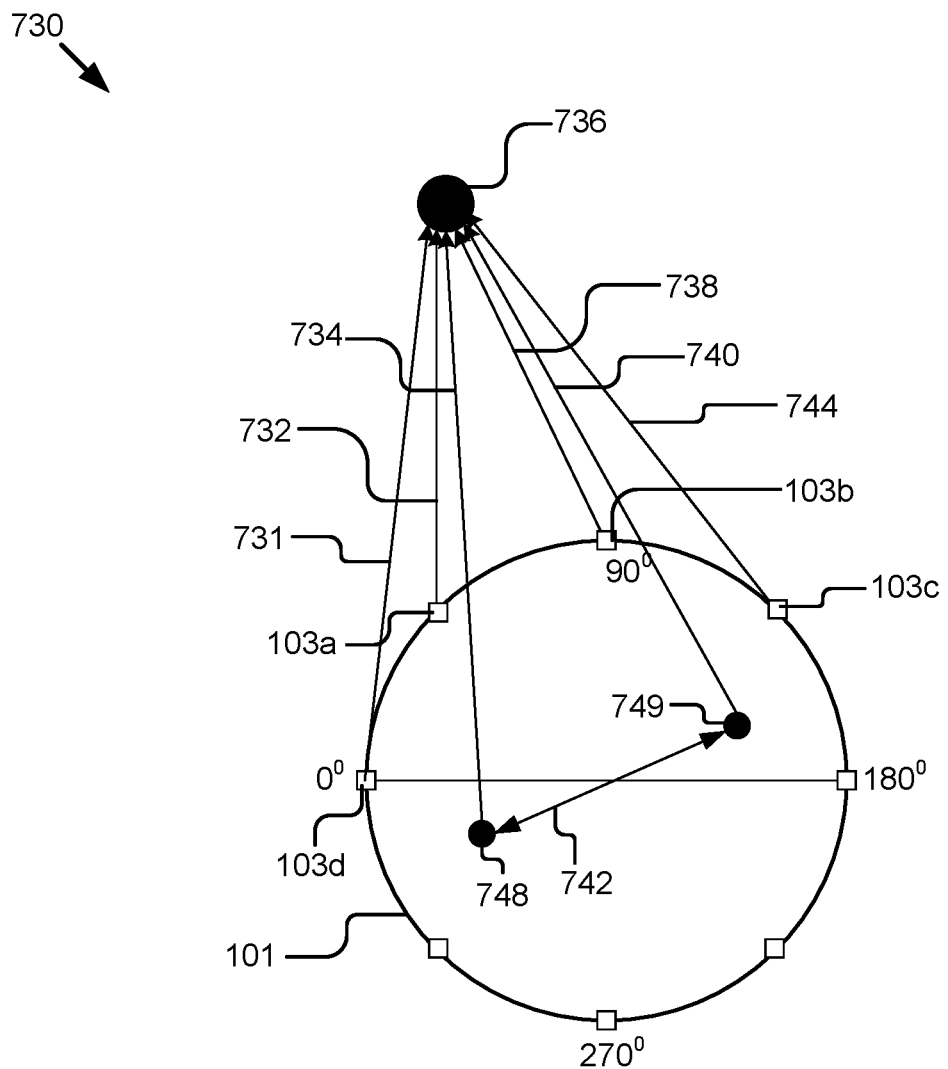

FIGS. 7A and 7B are graphic representations 700 and 730 that illustrate example processes of selecting matching camera modules 103 for a pixel in a left and a right panoramic images, arranged in accordance with at least some embodiments described herein. Referring to FIG. 7A, the camera array 101 includes camera modules 103A, 103B, 103C, 103D and other camera modules mounted on a spherical housing. Assume that a point 716 corresponds to a head rotation position with yaw=80° and pitch=0°. An interocular distance 712 is illustrated between a left eye position 718 and a right eye position 720. Since pitch=0°, interocular distance 712 is at its maximum value. Left eye position 718 and right eye position 720 may be determined by: (1) drawing a first line from point 716 to a center of the camera array 101; (2) determining an interocular distance based on a current pitch value; (3) drawing a second line that is perpendicular to the first line and also parallel to a plane with yaw=[0°, 360°] and pitch=0°, where the second line has a length equal to the determined interocular distance and is centered at the center of the camera array 101; and (4) configuring a left end point of the second line as left eye position 718 and a right end point of the second line as right eye position 720.

A left viewing direction 704 from left eye position 718 to point 716 and a right viewing direction 708 from right eye position 720 to point 716 are illustrated in FIG. 7A. Camera modules 103A, 103B, and 103C have viewing directions 714, 722, 710 to point 716, respectively.

Since viewing direction 714 of the camera module 103A is more parallel to left viewing direction 704 compared to other viewing directions 722 and 710 (e.g., an angle between viewing direction 714 and left viewing direction 704 is smaller than angles between left viewing direction 704 and other viewing directions 722 and 710), the camera module 103A is selected as a matching camera module that has a better view for point 716 than other camera modules in a left camera map. Since viewing direction 710 of the camera module 103C is more parallel to right viewing direction 708 compared to other viewing directions 722 and 714, the camera module 103C is selected as a matching camera module that has a better view for point 716 than other camera modules in a right camera map.

Referring to FIG. 7B, assume that a point 736 in a panorama corresponds to a head rotation position with yaw=80° and pitch=0°. An interocular distance 742 is illustrated between a left eye position 748 and a right eye position 749. A left viewing direction 734 from left eye position 748 to point 736 and a right viewing direction 740 from right eye position 749 to point 736 are illustrated in FIG. 7B. Camera modules 103A, 103B, 103C, and 103D have viewing directions 732, 738, 744, 731 to point 736, respectively. Since viewing direction 732 of the camera module 103A is more parallel to left viewing direction 734 compared to other viewing directions 738, 744, 731, the camera module 103A is selected as a matching camera module that has a better view for point 736 in a left camera map. Since viewing direction 738 of the camera module 103B is more parallel to right viewing direction 740 compared to other viewing directions 731, 734, 744, the camera module 103B is selected as a matching camera module that has a better view for point 736 in a right camera map.

In some embodiments, operations to determine a matching camera module for point 736 in a left panoramic image for left eye viewing may be summarized as follows: (1) determining a set of camera modules that have point 736 in their respective fields of view; (2) determining left viewing direction 734 from left eye position 748 to point 736; (3) determining a set of viewing directions to point 736 for the set of camera modules; (4) selecting viewing direction 732 from the set of viewing directions, where viewing direction 732 forms a smallest angle with left viewing direction 734 compared to angles formed between left viewing direction 734 and other viewing directions in the set (in other words, viewing direction 732 being more parallel to left viewing direction 734 than other viewing directions); and (5) configuring a matching camera module for point 736 as the camera module 103A that has viewing direction 732. Some other cost functions for determining the matching camera module for point 736 in the left panoramic image are possible as long as the cost functions may define some notion of best approximation to the view from left eye position 748.

Similarly, operations to determine a matching camera module for point 736 in a right panoramic image for right eye viewing may be summarized as the following: (1) determining the set of camera modules that have point 736 in their respective fields of view; (2) determining right viewing direction 740 from right eye position 749 to point 736; (3) determining the set of viewing directions to point 736 for the set of camera modules; (4) selecting viewing direction 738 from the set of viewing directions, where viewing direction 738 forms a smallest angle with right viewing direction 740 compared to angles formed between right viewing direction 740 and other viewing directions in the set; and (5) configuring a matching camera module for point 736 as the camera module 103B that has viewing direction 738. Some other cost functions for determining the matching camera module for point 736 in the right panoramic image are possible as long as the cost functions may define some notion of best approximation to the view from right eye position 749.

Example Generation of Virtual Reality Content

Figure 8A:
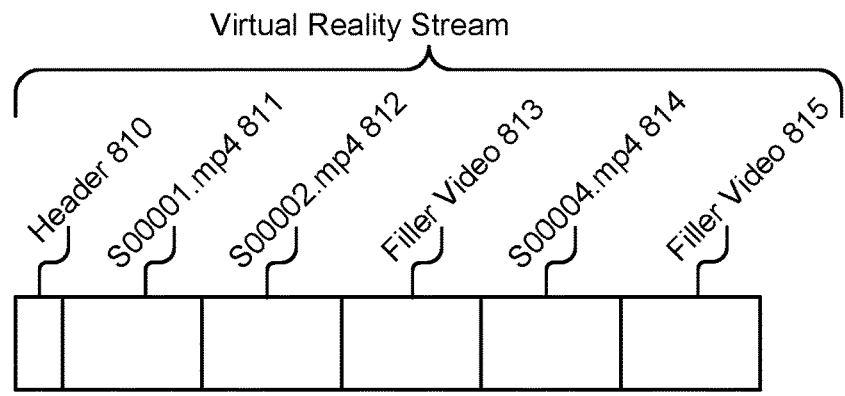
FIGS. 8A through 8C illustrate example virtual reality video streams generated by a concatenator according to some embodiments.
Figure 8B:
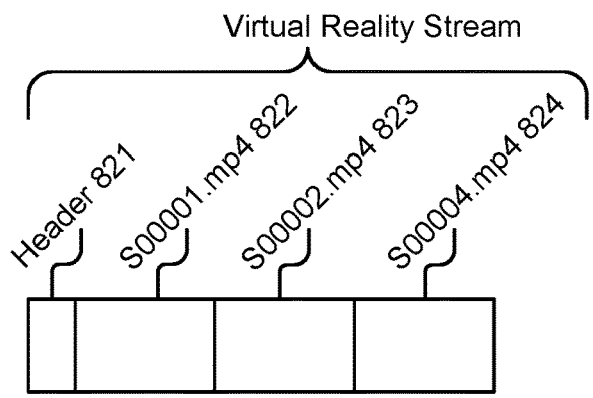
Figure 8C:
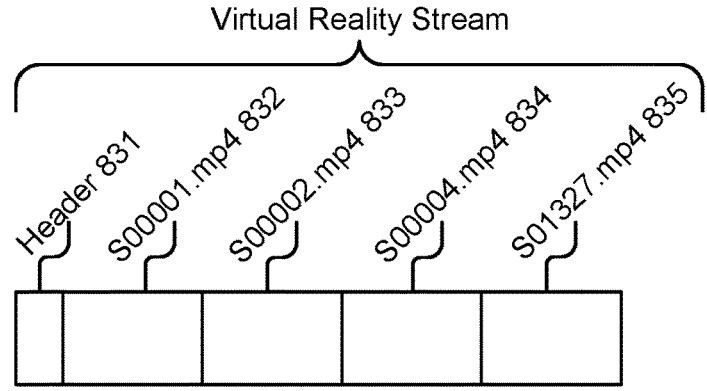

FIGS. 8A-8C are graphic representations of different embodiments of virtual reality video streams generated by the concatenator 212. In these embodiments, the concatenator 212 of FIG. 2 reads the state file 450 of FIG. 4B and determines that the processing of the video associated with shards 1, 2, and 4 is complete, the processing of the video associated with shard 3 is incomplete, and the processing of the video associated with shard 5 failed.

FIG. 8A depicts one example embodiment of a virtual reality stream 800. The concatenator 212 generates a header 810 based on the state file 450 of FIG. 8B and the video files used in generating the virtual reality video stream 800. Specifically, the concatenator 212 generates the header 810 for the virtual reality video stream 800 from s00001.mp4 811, s00002.mp4 812, filler video 813, s00004.mp4 814, and filler video 815.

The virtual reality video stream 800 continues with s00001.mp4 811, the video file associated with shard 1. The virtual reality video stream 800 continues with s00002.mp4 812, the video file associated with shard 2. The concatenator 212 determines that the video associated with shard 3 is in progress and, as a result, generates a filler video 813 after s00002.mp4 812 as a placeholder. The virtual reality video stream 800 continues with s00004.mp4 814, the video file associated with shard 4. The concatenator 212 determines that the video associated with shard 5 failed and, as a result, generates a filler video 815 after s00004.mp4 814.

The concatenator 212 may generate the virtual reality stream 830 before the worker nodes 155 complete the processing of the video associated with all of the shards. In this example, the video associated with shards 3 and 5 has not been processed but the concatenator 212 has generated a virtual reality video stream 800 from the video files for the shards 1, 2, and 4 that were completed.

FIG. 8B depicts another example embodiment of a virtual reality stream 820. The concatenator 212 generates a header 821 based on the state file 450 of FIG. 4B and the video files used in generating the virtual reality video stream 820. Specifically, the concatenator 212 generates the header 821 for the virtual reality video stream 820 from s00001.mp4 822, s00002.mp4 823, and s00004.mp4 824. The virtual reality video stream 820 continues with s00001.mp4 822, the video file associated with shard 1. The virtual reality video stream 820 continues with s00002.mp4 823, the video file associated with shard 2. In this embodiment, the concatenator 212 skips the video associated with shard 3 because the processing of the video associated with shard 3 is in progress. The virtual reality video stream 820 continues with s00004.mp4 824, the video file associated with shard 4. The concatenator 212 skips the video associated with shard 5 because the processing of the video associated with shard 5 failed.

The concatenator 212 may generate the virtual reality stream 830 before the worker nodes 155 complete the processing of the video associated with all of the shards. In this example, the video associated with shards 3 and 5 has not been processed but the concatenator 212 generated a virtual reality video stream 820 from the video files for the shards 1, 2, and 4 that are completed.

FIG. 8C depicts another example embodiment of a virtual reality stream 830. The concatenator 212 generates a header 831 based on the state file 450 of FIG. 4B and the video files used in generating the virtual reality video stream 830. The concatenator 212 generates the header 831 for the virtual reality video stream 830 from s00001.mp4 832, s00002.mp4 833, s00004.mp4 834, and s01327.mp4 835.

The virtual reality video stream 830 continues with s00001.mp4 931, the video file associated with shard 1. The virtual reality video stream 830 continues with s00002.mp4 932, the video file associated with shard 2. In this example, the concatenator 212 skips the video associated with shard 3 because the processing of the video associated with shard 3 is in progress. The virtual reality video stream 830 continues with s00004.mp4 834, the video file associated with shard 4. In this example, the concatenator 212 skips the video associated with shard 5 because the processing of the video associated with shard 5 failed.

The virtual reality video stream 830 continues with s01327.mp4 835, which is a video file associated with a shard from a different set of raw video feeds. For example, a user of the virtual reality application 104 may choose to combine video from a variety of different raw video feeds to generate the virtual reality video stream 830.

The concatenator 212 may generate the virtual reality stream 830 before the worker nodes 155 complete the processing of the video associated with all of the shards. In this example, the video associated with shards 3 and 5 has not been processed and so the concatenator 212 generates the virtual reality video stream 830 from the video files for the shards 1, 2, and 4 that are completed and a shard from a different raw video feed.

Figure 9A:
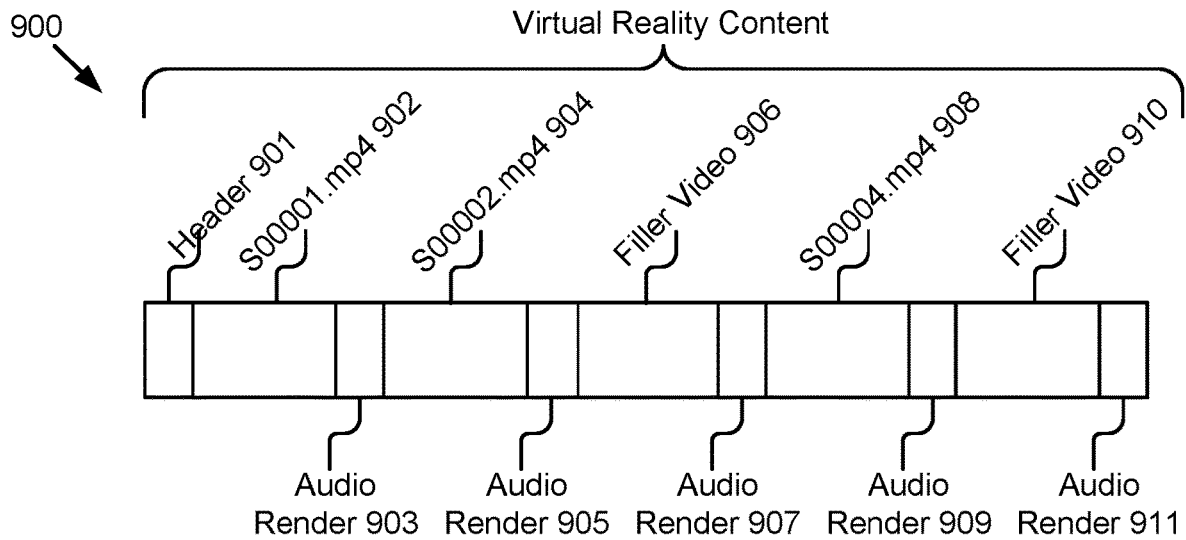
FIGS. 9A through 9C illustrate example virtual reality content generated by the concatenator according to some embodiments.
Figure 9B:
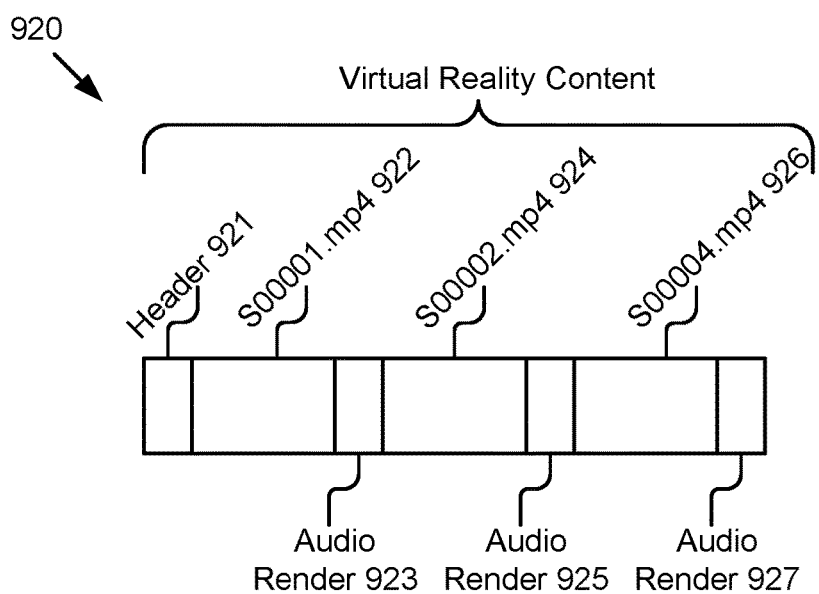
Figure 9C:
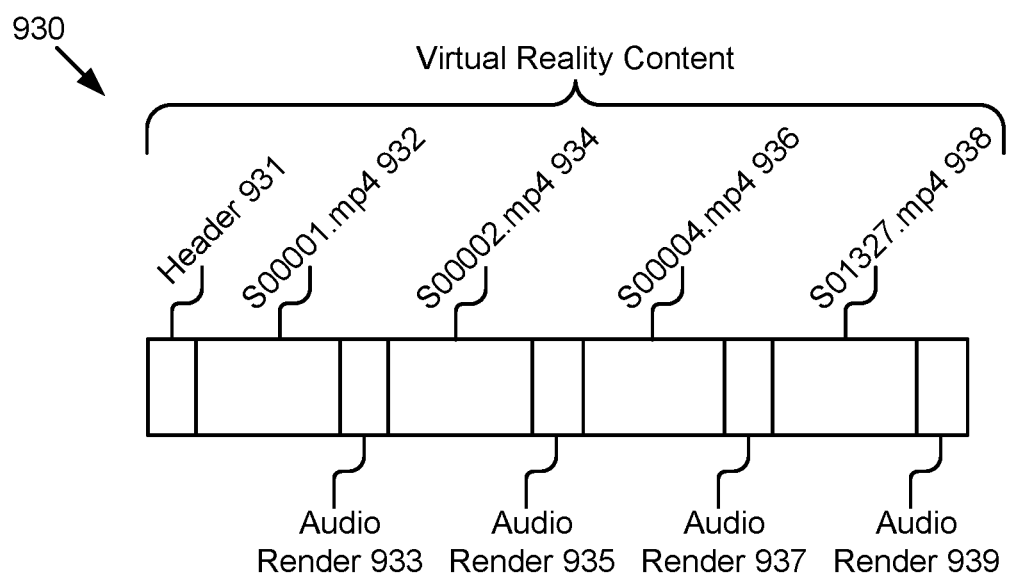

FIGS. 9A-9C are graphic representations of different embodiments of virtual reality content generated by the concatenator 212. In these embodiments, the concatenator 212 of FIG. 2 generates the virtual reality content from the virtual reality streams generated by the concatenator 212 that are described with reference to FIGS. 8A-8C, respectively. These virtual reality streams are based on the state file 450 of FIG. 4B, where the processing of the video associated with shards 1, 2, and 4 is complete, the processing of the video associated with shard 3 is incomplete, and the processing of the video associated with shard 5 failed.

FIG. 9A is an illustration of virtual reality content 900 generated from the virtual reality stream of FIG. 8A. The concatenator 212 generates a header 901 based on the state file 350 of FIG. 4B and the audio and video files used in generating the virtual reality content 900. Specifically, the concatenator 212 generates the header 901 from s00001.mp4 902, audio render 903, s00002.mp4 904, audio render 905, filler video 906, audio render 907, s00004.mp4 908, audio render 909, filler video 910, and audio render 911.

The virtual reality content 900 continues with s00001.mp4 902, the video file associated with shard 1. The virtual reality content 900 continues with the audio render 903 from a virtual reality audio render that is associated with the video file s00001.mp4 902. The virtual reality content continues with s00002.mp4 904, the video file associated with shard 2. The virtual reality content 900 continues with the audio render 905 from a virtual reality audio render that is associated with the video file s00002.mp4 904. The virtual reality content 900 continues with the filler video 906, which is associated with the incomplete processing of shard 3. The virtual reality content 900 continues with the audio render 907 from a virtual reality audio render that is associated with the video associated with shard 3. The virtual reality content 900 continues with s00004.mp4 908, the video file associated with shard 4. The virtual reality content 900 continues with the audio render 909 from a virtual reality audio render 946 that is associated with the video file s00004.mp4 908. The virtual reality content 900 continues with the filler video 910, which is associated with the failed processing of shard 5. The virtual reality content 900 continues with the audio render 911 from a virtual reality audio render that is associated with the video associated with shard 5.

The concatenator 212 may generate the virtual reality content 900 before the worker nodes 155 complete the processing of the video associated with all of the shards. In this example, the videos associated with shards 3 and 5 have not been processed but the concatenator 212 generated virtual reality content 900 that includes the video files for the shards 1, 2, and 4 that are completed as well as filler for the videos that were not completed.

FIG. 9B is an illustration of virtual reality content 920 generated from the virtual reality stream of FIG. 8B. The concatenator 212 generates a header 921 based on the state file 350 of FIG. 4B and the audio and video files used in generating the virtual reality content 920. Specifically, the concatenator 212 generates the header 921 from s00001.mp4 902, audio render 923, s00002.mp4 924, audio render 925, s00004.mp4 926, and audio render 927.

The virtual reality content 920 continues with s00001.mp4 922, the video file associated with shard 1. The virtual reality content 920 continues with the audio render 923 from a virtual reality audio render that is associated with the video file s00001.mp4 922. The virtual reality content 920 continues with s00002.mp4 924, the video file associated with shard 2. The virtual reality content 920 continues with the audio render 925 from a virtual reality audio render that is associated with the video file s00002.mp4 924. The concatenator 212 skips the video associated with shard 3 because the processing of the video associated with shard 3 is in progress. The virtual reality content 920 continues with s00004.mp4 926, the video file associated with shard 4. The virtual reality content 920 continues with the audio render 927 from a virtual reality audio render that is associated with the video file s00004.mp4 926. The concatenator 212 skips the video associated with shard 5 because the processing of the video associated with shard 5 failed.

The concatenator 212 may generate the virtual reality content 920 before the worker nodes 155 complete the processing of the video associated with all of the shards. In this example, the videos associated with shards 3 and 5 have not been processed and the concatenator 212 generated virtual reality content 920 that includes the video files for the shards 1, 2, and 4 that are completed.

FIG. 9C depicts another example embodiment of virtual reality content 930. The concatenator 212 generates a header 931 based on the state file 350 of FIG. 4B and the audio and video files used in generating the virtual reality content 920. Specifically, the concatenator 212 generates the header 931 from s00001.mp4 932, audio render 933, s00002.mp4 934, audio render 935, s00004.mp4 936, audio render 937, s01327.mp4 938, and audio render 939.

The virtual reality content 930 continues with s00001.mp4 932, the video file associated with shard 1. The virtual reality content 930 continues with the audio render 923 from a virtual reality audio render that is associated with the video file s00001.mp4 932. The virtual reality content 930 continues with s00002.mp4 934, the video file associated with shard 2. The virtual reality content 930 continues with the audio render 935 from a virtual reality audio render that is associated with the video file s00002.mp4 934. The concatenator 212 skips the video associated with shard 3 because the processing of the video associated with shard 3 is in progress. The virtual reality content 930 continues with s00004.mp4 936, the video file associated with shard 4. The virtual reality content 930 continues with the audio render 937 from a virtual reality audio render that is associated with the video file s00004.mp4 936. The concatenator 212 skips the video associated with shard 5 because the processing of the video associated with shard 5 failed. The concatenator 212 continues with s01327.mp4 938, which may be a video file associated with a shard from a different set of raw video feeds. For example, a user may choose to combine video from a variety of different raw video feeds to generate the virtual reality content 920. The concatenator 212 continues with the audio render 939 from a virtual reality audio render that is associated with the video file s01327.mp4 938.

The concatenator 212 may generate the virtual reality content 920 before the worker nodes 155 complete the processing of the video associated with all of the shards. In this example, the videos associated with shards 3 and 5 have not been processed and the concatenator 212 generated virtual reality content 920 that includes the video files for the shards 1, 2, 4, and the shard for the added video s01327mp4 that are completed.

Example Methods

Figure 10:
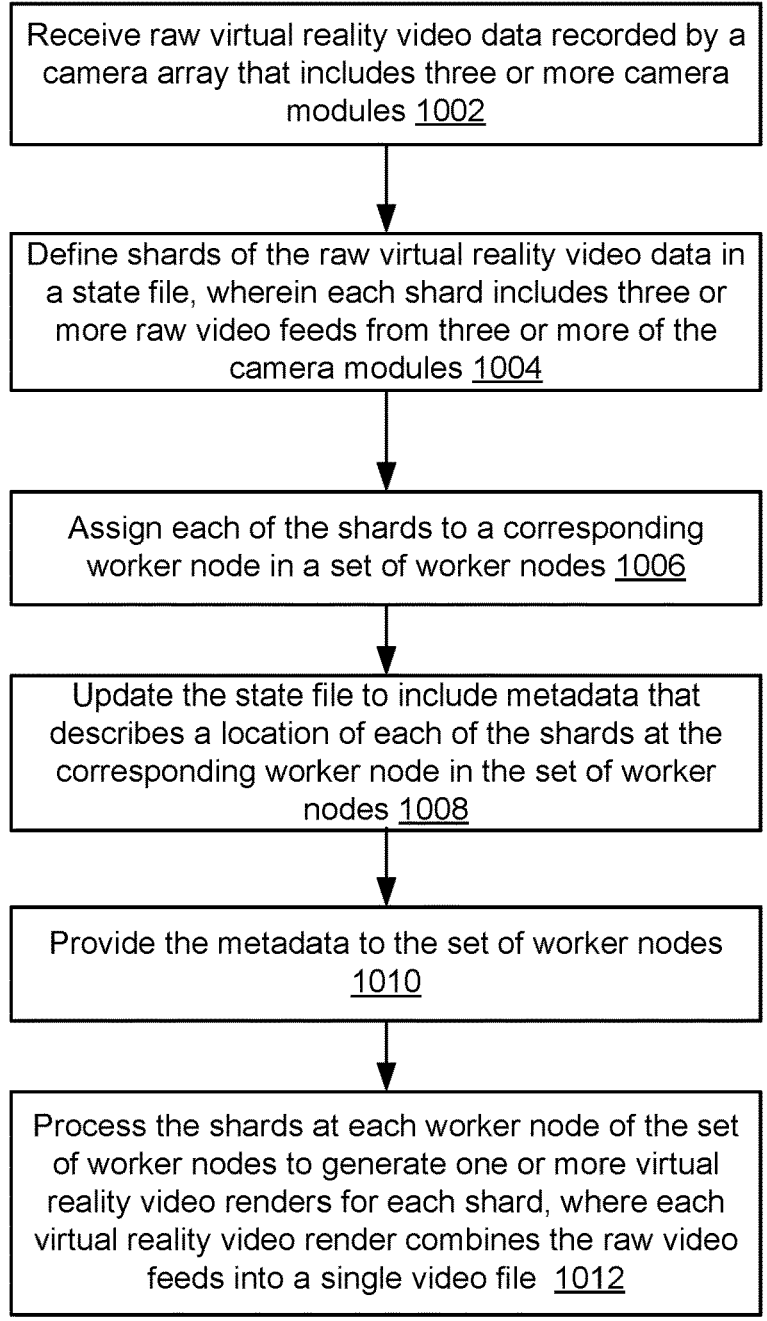
FIG. 10 illustrates an example method for sharding raw virtual reality video feeds to generate virtual reality video renders according to some embodiments.

Referring now to FIG. 10, an example method 1000 for processing raw virtual reality video data from different camera modules 103 by sharding is described according to some embodiments. The method 1000 may be performed by the worker node application 152, the worker nodes 155, the virtual reality application 104 of FIG. 1, or any combination the worker node application 152, the worker nodes 155, the virtual reality application 104. In some embodiments, the worker node application 152 and the virtual reality application 104 are one application instead of two separate applications. Although illustrated as discrete blocks, various blocks may be divided into additional blocks, combined into fewer blocks, or eliminated, depending on the embodiment.

At block 1002, raw virtual reality video data recorded by a camera array 101 that includes three or more camera modules is received. The raw virtual reality video data may comprise at least two raw video feeds from at least three camera modules 103 of the camera array 101. The raw virtual reality video data may be received from a first virtual reality camera, a second virtual reality camera, and a third virtual reality camera, wherein the first virtual reality camera, the second virtual reality camera, and the third virtual reality camera comprise at least one of different makes and different models.

At block 1004, shards of the raw virtual reality video data are defined in a state file 130, where each shard includes three or more raw video feeds from three or more of the camera modules 103. Each of the plurality of shards may comprise a set of corresponding segments of less than ninety seconds of each of the at least three raw video feeds of the raw virtual reality video data. Each of the corresponding segments may have a start time and an end time. Alternately or additionally, the plurality of shards may comprise a first shard comprising a set of corresponding segments of less than sixty seconds of each of the at least three raw video feeds of the raw virtual reality video data and a plurality of second shards, each of the plurality of second shards comprising a set of a last four frames of the at least three raw video feeds of the raw virtual reality video data of a preceding shard and corresponding segments of less than sixty seconds of each of the at least three raw video feeds of the raw virtual reality video data. In some embodiments, at least one of the shards includes raw video feeds that overlap with at least one of the other shards. For example, a first shard may include raw video feeds from 0 to 30.00 seconds and a second shard may include raw video feeds from 29.90 to 60.00 seconds.

At block 1006, each of the shares is assigned to a corresponding worker node 155 in a set of worker nodes 155. At block 1008, the state file 130 is updated to include metadata that describes a location of each of the shards at the corresponding worker node 155 in the set of worker nodes 155. For example, the state file 130 may indicate that shard 1 is assigned to worker node #1 155A. The metadata 135 may comprise the location of each of the at least three raw video feeds of the raw virtual reality video data of the plurality of shards and the start time and the end time of each of the sets of corresponding segments of the plurality of shards.

At block 1010, the metadata 135 is provided to the set of worker nodes 155. For example, the worker node application 152 may provide each of the worker nodes 155 in the set of worker nodes 155 with a state file 130.

At block 1012, the shards may be processed at each worker node 155 of the set of worker nodes 155 to generate one or more virtual reality video renders for each shard, where each virtual reality video render combines the raw video feeds into a single video file. In some embodiments, the processing includes image stitching to combine the raw video feeds from the different camera modules 103 to form a three-dimensional environment. The processing may also include image correction as discussed above.

Variations of the method disclosed may also be implemented. For example, raw virtual reality audio data recorded by a microphone array may be received at the cloud-based server through the network interface. The raw virtual reality audio data may be stored in the cloud storage location. The raw virtual reality audio data may be associated with the raw virtual reality video data. Further, the raw virtual reality audio data may be processed to generate a virtual reality audio render. The one or more virtual reality video renders for each of the plurality of shards and the virtual reality audio render may be interpreted based on the state file to generate a virtual reality audio-video stream.

As another example, the method may further include determining, in the state file, that one or more shards were unsuccessfully processed. The one or more unsuccessfully processed shards may be reassigned to one or more different worker nodes 155. The one or more unsuccessfully processed shards and the corresponding one or more reassigned different worker nodes 155 may be recorded in the state file 130. Metadata 135 for each of the one or more unsuccessfully processed shards may be provided to the one or more different worker nodes 155. The one or more unsuccessfully processed shards may be processed at the one or more different worker nodes 155 to generate one or more virtual reality video renders. Further, one or more successfully processed shards may be determined in the state file 130. The one or more virtual reality video renders corresponding to the one or more successfully processed shards may be interpreted based on the state file 130 to generate a virtual reality video stream.

FIG. 11 illustrates an example method 1100 for generating virtual reality content from virtual reality video renders according to some embodiments. The method 1100 may be performed by the worker node application 152, the worker nodes 155, the virtual reality application 104 of FIG. 1, or any combination the worker node application 152, the worker nodes 155, the virtual reality application 104. In some embodiments, the worker node application 152 and the virtual reality application 104 are one application instead of two separate applications. Although illustrated as discrete blocks, various blocks may be divided into additional blocks, combined into fewer blocks, or eliminated, depending on the embodiment.

At block 1102, from a state file 130 it is determined that processing of a first shard is complete, processing of a second shard is complete, and processing of a third shard is not complete or failed. At block 1104, a first virtual reality video render associated with the first shard and a second virtual reality video associated with the second shard are received. The first virtual reality video and the second virtual reality video are each virtual reality video renders that combine raw video feeds into a video file.

At block 1106, a header is generated from the first virtual reality video render, a first audio render that corresponds to the first virtual reality video render, a second virtual reality video render, a second audio render that corresponds to the second virtual reality video render, a filler video, and a third audio render that corresponds to the third shard.

At block 1108, virtual reality content is generated by concatenating the header, the first virtual reality video render, the first audio render, the second virtual reality video render, the second audio render, the filler video, and the third audio.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

Embodiments described herein may be implemented using computer-readable media for carrying or having computer-executable instructions or data structures stored thereon. Such computer-readable media may be any available media that may be accessed by a general-purpose or special-purpose computer. By way of example, and not limitation, such computer-readable media may include tangible computer-readable storage media including Random Access Memory (RAM), Read-Only Memory (ROM), Electrically Erasable Programmable Read-Only Memory (EE-PROM), Compact Disc Read-Only Memory (CD-ROM) or other optical disk storage, magnetic disk storage or other magnetic storage devices, flash memory devices (e.g., solid state memory devices), or any other storage medium which may be used to carry or store desired program code in the form of computer-executable instructions or data structures and which may be accessed by a general-purpose or special-purpose computer. Combinations of the above may also be included within the scope of computer-readable media.

Computer-executable instructions comprise, for example, instructions and data which cause a general-purpose computer, special-purpose computer, or special-purpose processing device (e.g., one or more processors) to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the terms "module" or "component" may refer to specific hardware embodiments configured to perform the operations of the module or component and/or software objects or software routines that may be stored on and/or executed by general-purpose hardware (e.g., computer-readable media, processing devices, etc.) of the computing system. In some embodiments, the different components, modules, engines, and services described herein may be implemented as objects or processes that execute on the computing system (e.g., as separate threads). While some of the system and methods described herein are generally described as being implemented in software (stored on and/or executed by general-purpose hardware), specific hardware embodiments or a combination of software and specific hardware embodiments are also possible and contemplated. In this description, a "computing entity" may be any computing system as previously defined herein, or any module or combination of modulates running on a computing system.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

All examples and conditional language recited herein are intended for pedagogical objects to aid the reader in understanding the disclosure and the concepts contributed by the inventor to furthering the art, and are to be construed as being without limitation to such specifically recited examples and conditions. Although embodiments of the disclosures have been described in detail, it may be understood that the various changes, substitutions, and alterations could be made hereto without departing from the spirit and scope of the disclosure.

That which is claimed:

1. A three-dimensional processing method comprising:
   receiving raw three-dimensional video data recorded by a camera array, wherein the camera array includes three or more camera modules;
   defining a first shard, a second shard, and a third shard of the raw three-dimensional video data in a state file, wherein each shard includes three or more raw video feeds from the three or more camera modules;
   assigning each shard to a corresponding worker node in a set of worker nodes;
   updating the state file to include metadata that describes a location of each shard at the corresponding worker node in the set of worker nodes;
   providing the metadata to the set of worker nodes;
   processing the first shard, the second shard, and the third shard to generate one or more three-dimensional video renders for each shard;
   determining, from the state file, that processing of the first shard is complete, processing of the second shard is complete, and processing of the third shard is incomplete; and
   generating three-dimensional content by concatenating a first three-dimensional video render, a first audio render associated with the first shard, a second three-dimensional video render, and a second audio render associated with the second shard, and a filler video that is a placeholder for a third three-dimensional video render until the third shard is processed.

2. The method of claim 1, wherein processing of the third shard is incomplete because processing of the third shard is in process or unsuccessful.

3. The method of claim 1, wherein generating the three-dimensional content by concatenating further includes concatenating a third audio render that corresponds to the third shard.

4. The method of claim 3, further comprising generating a header from the first three-dimensional video render, the first audio render, the second three-dimensional video render, the second audio render, the filler video, and the third audio render;
   wherein generating the three-dimensional content by concatenating further includes concatenating the header.

5. The method of claim 1, wherein generating the three-dimensional content by concatenating further includes concatenating a fourth three-dimensional video render associated with a fourth shard from a different set of raw video feeds and a fourth audio render that corresponds to the fourth shard.

6. The method of claim 1, further comprising:
   reassigning the third shard to one or more different worker nodes;
   updating the state file to indicate the location of the one or more different worker nodes that process the third shard;
   providing the metadata for the third shard to the one or more different worker nodes; and
   processing at the one or more different worker nodes the third shard to generate the one or more three-dimensional video renders.

7. The method of claim 1, wherein the first shard comprises a set of corresponding segments of less than ninety seconds of each of at least three raw video feeds of the raw three-dimensional video data, each corresponding segment having a start time and an end time.

8. A system for processing cloud-based three-dimensional content, comprising:
   one or more processors; and
   a non-transitory memory storing computer code which, when executed by the one or more processors causes the one or more processors to:
   receive raw three-dimensional video data recorded by a camera array, wherein the camera array includes three or more camera modules;
   define a first shard, a second shard, and a third shard of the raw three-dimensional video data in a state file, wherein each shard includes three or more raw video feeds from the three or more camera modules;
   assign each shard to a corresponding worker node in a set of worker nodes;

update the state file to include metadata that describes a location of each shard at the corresponding worker node in the set of worker nodes;

provide the metadata to the set of worker nodes;

process the first shard, the second shard, and the third shard to generate one or more three-dimensional video renders for each shard, where each three-dimensional video render combines the raw video feeds into a single video file;

determine, from the state file, that processing of the first shard is complete, processing of the second shard is complete, and processing of the third shard is incomplete; and generate three-dimensional content by concatenating a first three-dimensional video render, a first audio render associated with the first shard, a second three-dimensional video render, and a second audio render associated with the second shard, and a filler video that is a placeholder for a third three-dimensional video render until the third shard is processed.

9. The system of claim 8, wherein processing of the third shard is incomplete because processing of the third shard is in progress or unsuccessful.

10. The system of claim 8, wherein generating the three-dimensional content by concatenating further includes concatenating a third audio render that corresponds to the third shard.

11. The system of claim 10, wherein:

the computer code is further operable to cause the one or more processors to generate a header from the first three-dimensional video render, the first audio render, the second three-dimensional video render, the second audio render, the filler video, and the third audio render; and generating the three-dimensional content by concatenating further includes concatenating the header.

12. The system of claim 8, wherein generating the three-dimensional content by concatenating further includes concatenating a fourth three-dimensional video render associated with a fourth shard from a different set of raw video feeds and a fourth audio render that corresponds to the fourth shard.

13. The system of claim 8, wherein the computer code is further operable to cause the one or more processors to:

reassign the third shard to one or more different worker nodes;

update the state file to indicate the location of the one or more different worker nodes that process the third shard;

provide the metadata for the third shard to the one or more different worker nodes; and process at the one or more different worker nodes the third shard to generate the one or more three-dimensional video renders.

14. The system of claim 8, wherein the first shard comprises a set of corresponding segments of less than ninety seconds of each of at least three raw video feeds of the raw three-dimensional video data, each corresponding segment having a start time and an end time.

15. A non-transitory memory encoded with a computer program, the computer program comprising instructions that, when executed by one or more processors, cause the one or more processors to perform operations comprising:

receiving raw three-dimensional video data recorded by a camera array, wherein the camera array includes three or more camera modules;

defining a first shard, a second shard, and a third shard of the raw three-dimensional video data in a state file, wherein each shard includes three or more raw video feeds from the three or more camera modules;

assigning each shard to a corresponding worker node in a set of worker nodes;

updating the state file to include metadata that describes a location of each shard at the corresponding worker node in the set of worker nodes;

providing the metadata to the set of worker nodes;

processing the first shard, the second shard, and the third shard to generate one or more three-dimensional video renders for each shard, where each three-dimensional video render combines the raw video feeds into a single video file;

determining, from the state file, that processing of the first shard is complete, processing of the second shard is complete, and processing of the third shard is incomplete; and generating three-dimensional content by concatenating a first three-dimensional video render, a first audio render associated with the first shard, a second three-dimensional video render, and a second audio render associated with the second shard, and a filler video that is a placeholder for a third three-dimensional video render until the third shard is processed.

16. The non-transitory memory of claim 15, wherein processing of the third shard is incomplete because processing of the third shard is in progress or unsuccessful.

17. The non-transitory memory of claim 15, wherein generating the three-dimensional content by concatenating further includes concatenating a third audio render that corresponds to the third shard.

18. The non-transitory memory of claim 15, wherein generating the three-dimensional content by concatenating further includes concatenating a fourth three-dimensional video render associated with a fourth shard from a different set of raw video feeds and a fourth audio render that corresponds to the fourth shard.

19. The non-transitory memory of claim 15, wherein:

the instructions are further operable to perform operations comprising generating a header from the first three-dimensional video render, the first audio render, the second three-dimensional video render, the second audio render, the filler video, and a third audio render; and generating the three-dimensional content by concatenating further includes concatenating the header.

20. The non-transitory memory of claim 15, wherein the instructions are further operable to perform operations comprising:

reassigning the third shard to one or more different worker nodes;

updating the state file to indicate the location of the one or more different worker nodes that process the third shard;

providing the metadata for the third shard to the one or more different worker nodes; and processing at the one or more different worker nodes the third shard to generate the one or more three-dimensional video renders.

* * * * *